US010316211B2

(12) United States Patent
Niederst et al.

(10) Patent No.: US 10,316,211 B2
(45) Date of Patent: *Jun. 11, 2019

(54) STABILIZER AND COATING COMPOSITIONS THEREOF

(71) Applicant: SWIMC LLC, Cleveland, OH (US)

(72) Inventors: Jeffrey Niederst, Leechburg, PA (US); Richard H. Evans, Wexford, PA (US); Robert M. O'Brien, Monongahela, PA (US); Kevin Romagnoli, Pittsburgh, PA (US); Mark S. Von Maier, Harmony, PA (US); Mary E. Tishey, Valencia, PA (US); Gregory M. Paulson, Slippery Rock, PA (US)

(73) Assignee: SWIMC LLC, Cleveland, OH (US)

( * ) Notice: Subject to any disclaimer, the term of this patent is extended or adjusted under 35 U.S.C. 154(b) by 590 days.

This patent is subject to a terminal disclaimer.

(21) Appl. No.: 14/417,970

(22) PCT Filed: Mar. 15, 2013

(86) PCT No.: PCT/US2013/032639
§ 371 (c)(1),
(2) Date: Jan. 28, 2015

(87) PCT Pub. No.: WO2014/025410
PCT Pub. Date: Feb. 13, 2014

(65) Prior Publication Data
US 2015/0203713 A1    Jul. 23, 2015

Related U.S. Application Data

(60) Provisional application No. 61/681,602, filed on Aug. 9, 2012.

(51) Int. Cl.
| C09D 163/00 | (2006.01) |
| C08G 59/18 | (2006.01) |
| C08G 59/06 | (2006.01) |

(52) U.S. Cl.
CPC ......... *C09D 163/00* (2013.01); *C08G 59/066* (2013.01); *C08G 59/18* (2013.01); *C08G 2650/56* (2013.01)

(58) Field of Classification Search
CPC ..... C09D 163/00; C08G 59/066; C08G 59/18
See application file for complete search history.

(56) References Cited

U.S. PATENT DOCUMENTS

| 3,085,992 A | 4/1963 | Lee et al. |
| 3,153,008 A | 10/1964 | Fox |
| 3,220,974 A | 11/1965 | Fox |
| 3,275,601 A | 9/1966 | Schnell et al. |
| 3,383,008 A | 5/1968 | Lipske |
| 3,491,111 A | 1/1970 | Lin |
| 3,491,112 A | 1/1970 | Lin |
| 3,491,116 A | 1/1970 | Lin |
| 3,509,174 A | 4/1970 | Lin |
| 3,539,375 A | 11/1970 | Henry |
| 3,624,107 A | 11/1971 | Lin |
| 3,627,787 A | 12/1971 | Lin |
| 3,641,011 A | 2/1972 | Lin et al. |
| 3,642,828 A | 2/1972 | Farber et al. |
| 3,681,390 A | 8/1972 | Lin |
| 3,775,424 A | 11/1973 | Farber |
| 3,853,869 A | 12/1974 | Farber |
| 3,879,348 A | 4/1975 | Serini et al. |
| 3,888,812 A | 6/1975 | Plettner |
| 3,920,510 A | 11/1975 | Hatano et al. |
| 3,959,571 A | 5/1976 | Yahagi et al. |
| RE28,862 E | 6/1976 | Siemonsen et al. |
| 3,971,808 A | 7/1976 | Baumann et al. |
| 4,011,184 A | 3/1977 | van Reijendam et al. |
| 4,076,764 A | 2/1978 | Bauer |
| 4,111,910 A | 9/1978 | Baggett |
| 4,172,103 A | 10/1979 | Serini et al. |
| 4,333,809 A | 6/1982 | Schreckenberg et al. |
| 4,340,716 A | 7/1982 | Hata et al. |
| 4,368,315 A | 1/1983 | Sikdar |
| 4,374,233 A | 2/1983 | Loucks et al. |
| 4,468,483 A | 8/1984 | Yeakey et al. |
| 4,510,513 A | 4/1985 | Yamaguchi et al. |
| 4,522,984 A | 6/1985 | Watanabe et al. |
| 4,564,655 A | 1/1986 | Liu |
| 4,611,036 A | 9/1986 | Sekiguchi et al. |
| 4,657,941 A | 4/1987 | Blackwell et al. |
| 4,696,955 A | 9/1987 | Kuhlmann |

(Continued)

FOREIGN PATENT DOCUMENTS

| EP | 0 265 791 A2 | 5/1988 |
| EP | 0 313 862 A2 | 5/1989 |

(Continued)

OTHER PUBLICATIONS

Fang, H. et al.., "Structure-Activity Relationships for a Large Diverse Set of Natural, Synthetic, and Environmental Estrogens." Chem. Res. Toxicol, vol. 14, No. 3, pp. 280-294 (2001). Meti, "Current Status of Testing Methods Development for Endocrine Distrupters." 6th Meeting of the Task Force on Edocrine Distrupters Testing and Assessment (EDTA), Tokyo, Ministry of Economy, Trade and Industry, Japan, 70 pages (Jun. 24-25 2002).

Kitamura, S., et al., "Comparative Study of the Endocrine-Disrupting Activity of Bisphenol A and 19 Related Compounds," Toxicological Sciences, vol. 84, 249-259, doi:10.1093/toxcie/kfi074, Advance Access publication, 11 pages (Jan. 5, 2005).

(Continued)

*Primary Examiner* — John E Uselding
(74) *Attorney, Agent, or Firm* — Patterson Thuente Pedersen, P.A.

(57) ABSTRACT

Coating compositions that include a thermoplastic dispersion and an epoxy-functional stabilizer having polyhydric phenols that exhibit estrogenic activity less than bisphenol S.

22 Claims, No Drawings

(56) References Cited

U.S. PATENT DOCUMENTS

| | | | |
|---|---|---|---|
| 4,729,983 A | 3/1988 | Satake et al. |
| 4,794,102 A | 12/1988 | Petersen et al. |
| 4,794,156 A | 12/1988 | Ho et al. |
| 4,816,495 A | 3/1989 | Blackwell et al. |
| 4,849,502 A | 7/1989 | Evans et al. |
| 4,880,892 A | 11/1989 | Urano et al. |
| 4,994,217 A | 2/1991 | Banevicius et al. |
| 5,010,147 A | 4/1991 | Westeppe et al. |
| 5,032,567 A | 7/1991 | Ohtsubo et al. |
| 5,068,284 A | 11/1991 | Ullman et al. |
| 5,080,961 A | 1/1992 | Macy et al. |
| 5,102,608 A | 4/1992 | Frencken et al. |
| 5,288,839 A | 2/1994 | Greco |
| 5,310,854 A | 5/1994 | Heinmeyer et al. |
| 5,318,899 A | 6/1994 | Scarborough et al. |
| 5,318,999 A | 6/1994 | Mitra et al. |
| 5,446,009 A | 8/1995 | Minami et al. |
| 5,494,950 A | 2/1996 | Asakage et al. |
| 5,496,921 A | 3/1996 | Sakashita et al. |
| 5,576,413 A | 11/1996 | Bussink et al. |
| 5,591,788 A | 1/1997 | Anderson et al. |
| 5,654,382 A | 8/1997 | Dubois et al. |
| 5,803,301 A | 9/1998 | Sato et al. |
| 5,807,912 A | 9/1998 | Wu et al. |
| 5,859,172 A | 1/1999 | Sakashita et al. |
| 5,876,210 A | 3/1999 | Klee et al. |
| 5,880,248 A | 3/1999 | Sakashita et al. |
| 6,043,333 A | 3/2000 | Kuboki et al. |
| 6,046,284 A | 4/2000 | Shinohara et al. |
| 6,048,931 A | 4/2000 | Fujita et al. |
| 6,060,577 A | 5/2000 | Davis |
| 6,103,311 A | 8/2000 | Masuda et al. |
| 6,133,402 A | 10/2000 | Coates et al. |
| 6,184,339 B1 | 2/2001 | Stansbury et al. |
| 6,225,436 B1 | 5/2001 | Eiffler et al. |
| 6,399,738 B1 | 6/2002 | Ito |
| 6,469,127 B1 | 10/2002 | Furunaga et al. |
| 6,566,426 B1 | 5/2003 | Kanaida et al. |
| 6,579,829 B2 | 6/2003 | Nishimura et al. |
| 6,608,163 B2 | 8/2003 | Bailly et al. |
| 6,660,688 B2 | 12/2003 | Yamada et al. |
| 6,723,765 B2 | 4/2004 | Bammel |
| 6,833,398 B2 | 12/2004 | Agarwal et al. |
| 6,844,071 B1 | 1/2005 | Wang et al. |
| 6,916,874 B2 | 7/2005 | Mazza et al. |
| 6,924,328 B2 | 8/2005 | Legleiter et al. |
| 6,984,262 B2 | 1/2006 | King et al. |
| 6,984,608 B2 | 1/2006 | Makitalo et al. |
| 7,022,765 B2 | 4/2006 | Adedeji et al. |
| 7,087,705 B2 | 8/2006 | Ashtekar et al. |
| 7,141,359 B2 | 11/2006 | Suga et al. |
| 7,256,228 B2 | 8/2007 | Agarwal et al. |
| 7,332,560 B2 | 2/2008 | Heuer et al. |
| 7,635,662 B2 | 12/2009 | Kabashima et al. |
| 7,682,674 B2 | 3/2010 | Vogt et al. |
| 7,803,439 B2 | 9/2010 | Crawford et al. |
| 7,803,440 B2 | 9/2010 | Crawford et al. |
| 8,124,669 B2 | 2/2012 | Terakawa et al. |
| 8,142,858 B2 | 3/2012 | Cooke et al. |
| 8,353,657 B2 | 1/2013 | Lat et al. |
| 8,795,830 B2 | 8/2014 | Wyman et al. |
| 8,906,507 B2 | 12/2014 | Campbell et al. |
| 9,096,772 B2 | 8/2015 | Lespinasse et al. |
| 9,168,206 B2 | 10/2015 | Wang et al. |
| 9,475,328 B2 | 10/2016 | Niederst et al. |
| 9,540,484 B2 | 1/2017 | Craun et al. |
| 9,605,177 B2 | 3/2017 | Tang et al. |
| 9,724,276 B2 | 8/2017 | Niederst et al. |
| 2003/0069334 A1* | 4/2003 | Legleiter ............... C09D 7/125 523/400 |
| 2003/0170396 A1 | 9/2003 | Yokoi et al. |
| 2003/0181628 A1 | 9/2003 | Horn et al. |
| 2003/0203991 A1 | 10/2003 | Schottman et al. |
| 2003/0209553 A1 | 11/2003 | Horn et al. |
| 2003/0232145 A1 | 12/2003 | Inomata et al. |
| 2004/0044101 A1 | 3/2004 | Hirose et al. |
| 2004/0176563 A1 | 9/2004 | Shinohara et al. |
| 2004/0220372 A1 | 11/2004 | Qi et al. |
| 2004/0242723 A1 | 12/2004 | Jin et al. |
| 2005/0014004 A1 | 1/2005 | King et al. |
| 2005/0090593 A1 | 4/2005 | Heuer et al. |
| 2006/0025559 A1 | 2/2006 | Wehrmann et al. |
| 2006/0052523 A1 | 3/2006 | Bushendorf et al. |
| 2006/0134541 A1 | 6/2006 | Fuji et al. |
| 2007/0036903 A1 | 2/2007 | Mayr et al. |
| 2007/0087146 A1 | 4/2007 | Evans et al. |
| 2007/0099130 A1 | 5/2007 | Takahashi et al. |
| 2008/0246173 A1 | 10/2008 | Braidwood et al. |
| 2008/0314500 A1 | 12/2008 | Boers et al. |
| 2008/0319156 A1 | 12/2008 | Fischer et al. |
| 2009/0326107 A1 | 12/2009 | Bittner |
| 2010/0056721 A1 | 3/2010 | Wright et al. |
| 2010/0086716 A1 | 4/2010 | Rüdiger et al. |
| 2011/0042338 A1 | 2/2011 | Pecorini et al. |
| 2011/0160408 A1 | 6/2011 | de Brouwer et al. |
| 2011/0275035 A1 | 11/2011 | Lu |
| 2011/0315591 A1 | 12/2011 | Lespinasse et al. |
| 2012/0125800 A1 | 5/2012 | Doreau et al. |
| 2012/0172568 A1 | 7/2012 | Ueda |
| 2012/0276315 A1 | 11/2012 | Michel et al. |
| 2012/0276503 A1 | 11/2012 | Wang et al. |
| 2013/0052381 A1 | 2/2013 | Gallucci et al. |
| 2013/0206756 A1 | 8/2013 | Niederst |
| 2013/0280455 A1 | 10/2013 | Evans et al. |
| 2013/0316109 A1 | 11/2013 | Niederst et al. |
| 2014/0113093 A1 | 4/2014 | Corbin et al. |
| 2014/0322465 A1 | 10/2014 | Kaleem et al. |
| 2016/0107818 A1 | 4/2016 | Kaleem et al. |

FOREIGN PATENT DOCUMENTS

| | | | |
|---|---|---|---|
| EP | 0620238 A2 | 10/1994 | |
| EP | 0185118 B1 | 9/1995 | |
| EP | 1393923 A1 | 3/2004 | |
| EP | 1637337 A1 | 3/2006 | |
| GB | 1037895 A | 8/1966 | |
| JP | 03076770 | 4/1991 | |
| JP | 07109328 A | 4/1995 | |
| JP | H07-126574 A | 5/1995 | |
| JP | 08-230328 | 9/1996 | |
| JP | 2002-097250 A | 4/2002 | |
| JP | 2002-138245 A | 5/2002 | |
| JP | 2003-176348 A | 6/2003 | |
| JP | 3 484546 B2 | 1/2004 | |
| JP | 2004-10874 A | 1/2004 | |
| KR | 20010090730 A | 10/2001 | |
| WO | WO-9526997 A1 | 10/1995 | |
| WO | WO 97/28905 | 8/1997 | |
| WO | WO 98/50477 | 11/1998 | |
| WO | WO 00/71337 A1 | 11/2000 | |
| WO | WO-2004050740 A1 | 6/2004 | |
| WO | WO 2007/048094 A2 | 4/2007 | |
| WO | WO 2008/137562 A1 | 11/2008 | |
| WO | WO 2009/015493 A1 | 2/2009 | |
| WO | WO-2010068673 A1 | 6/2010 | |
| WO | WO 2010/118349 A1 | 10/2010 | |
| WO | WO 2010/118356 A1 | 10/2010 | |
| WO | WO 2011/130671 A2 | 10/2011 | |
| WO | WO 2012/109278 A2 | 8/2012 | |
| WO | WO 2012/161758 | * 11/2012 | ........... C09D 171/00 |
| WO | WO-2012160172 A1 | 11/2012 | |
| WO | WO 2014/140233 A1 | 9/2014 | |
| WO | WO 2014/140234 A1 | 9/2014 | |
| WO | WO-2016201407 A1 | 12/2016 | |

OTHER PUBLICATIONS

Liu Z., et al., "Preparation, characterization and thermal properties of tetramethylbisphenol F expoxy resin and mixed systems," Polym Int 2012; 61: 565-570, © 2011 Society of Chemical Industry, published online in Wiley Online Library: 6 pages (Nov. 10, 2011).

(56) References Cited

OTHER PUBLICATIONS

Fang H., et al., "Quantitative Comparisons of in Vitro Assays for Estrogenic Activities," Environmental Health Perspectives, vol. 108, No. 8, pp. 723-729, 7 pages (Aug. 2000).
"Test Method Nomination: MCF-7 Cell Proliferation Assay of Estrogenic Activity" submitted for validation by CertiChem, Inc. to the National Toxicology Program Interagency Center for the Evaluation of Alternative Toxicological Methods (NICEATM) on Jan. 19, 2006 (102 pages, available online at ntp.niehs.nih.gov/iccvam/methods/endocrine/endodocs/submdoc.pdf).
Matasa, C., et al., "A wish list for orthodontic materials, 2005" The Orthodontic Materials Insider, vol. 16 Nr. 4, 8 pages (Dec. 2004).
Moss, G.P., "Extension and Revision of the Von Baeyer System for Naming Polycyclic Compounds (Including Bycyclic Compounds)", IUPAC Recommendations 1999, Pure Appl. Chem., vol. 71, No. 3, pp. 513-529, 17 pages (1999).
Song, K., et al., :Endocrine Disrupter Bisphenol A Induces Orphan Nuclear Receptor Nur77 Gene Expression and Steroidogenesis in Mouse Testicular Leydig Cells, Endocrinology 143(6):2208-2215, Copyright 2002 by The Endocrine Society, 8 pages.
Kobayashi, S. et al., "Stereo Structure-Controlled and Electronic Structure-Controlled Estrogen-Like Chemicals to Design and Develop Non-estrogenic Bisphenol A Analogs Based on Chemical Hardness Concept," Chem. Pharm. Bull. 54(12):1633-1638, 2006 Pharmaceutical Society of Japan, 6 pages (Dec. 2006).
"Flame Retardant Bisphenol F", Product Information Sheets, Nippon Kasei Chemical, 2 pages (2013).
Eastman, "Eastman Tritan™ Copolyester—Lack of estrogen and testosterone activity," TRS-270, 3 pages (Apr. 2010).
Viñas, P. et al, "Comparison of two derivatization-based methods for solid-phase microextraction-gas chromotography-mass spectrometric determination of bisphenol A, bisphenol S. and bisphenol migarted from food cans," published online Feb. 3, 2010, Springer-Verlag, 11 pages (2010).
Dytek® A-Amine (2014) downloaded from the Oct. 16, 2014 Internet Archives capture at https://web.archive.org/web/20141016043145/http://dytek.invista.com/Products/Amines/dytek-a-amine.
Tice, R.R. "The single cell gel/comet assay: a microgel electrophoretic technique for the detection of DNA damage and repair in individual cells." Environmental Mutagenesis, Eds. Phillips, D.H and Venitt, S. Bios Scientific, Oxford, UD, pp. 315-339 (1995).
Woo, B. et al., Melt Polycondensation of Bisphenol a Polycarbonate by a Forced Gas Sweeping Process, Ind. Eng. Chem. Res., vol. 40, No. 5, pp. 1312-1319 (2001).
Polycarbonates, 4th-5th Edition, Kirk-Othmer Encyclopedia of Chemical Technology, pp. 1-30 (2000).
Porter, D. S. et al., Hot-Fill Containers, New Tech for OPP & PET, Plastics Technology, Eastman Chemical Co., 6 pages (Dec. 2007).
Grace Darex® Packaging Technologies, A Global Partner for your global business, Product Book, 4 pages (2006).
Mendum, T. et al., "Research Letter, Concentration of bisphenol A in thermal paper", Green Chemistry Letters and Reviews, vol. 4, No. 1, pp. 81-86 (Mar. 2011).
Matsumoto, S. et al., "The crystal structure of two new developers for high-performance thermo-sensitive paper: H-bonded network in urea-urethane derivatives", Dyes and Pigments, 85, pp. 139-142 (2010).
Co-pending U.S. Appl. No. 14/418,040, filed Jan. 28, 2015.
Hashimoto et al., "Measurement of Estrogenic Activity of Chemicals for the Development of New Dental Polymer," Toxicology in Vitro, 2001, vol. 15 (4-5), pp. 421-425.
International Preliminary Report on Patentability for Application No. PCT/US2013/031979, mailed on Feb. 19, 2015, 6 pages.
International Preliminary Report on Patentability for Application No. PCT/US2013/032262, mailed on Feb. 19, 2015, 6 pages.
International Preliminary Report on Patentability for Application No. PCT/US2013/032639, mailed on Feb. 19, 2015, 7 pages.
International Preliminary Report on Patentability for Application No. PCT/US2013/032648, mailed on Feb. 19, 2015, 9 pages.
International Search Report and Written Opinion for Application No. PCT/US2013/031979, dated Jun. 28, 2013, 7 pages.
International Search Report and Written Opinion for Application No. PCT/US2013/032262, dated Jul. 26, 2013, 7 pages.
International Search Report and Written Opinion for Application No. PCT/US2013/032639, dated Jul. 10, 2013, 9 pages.
International Search Report and Written Opinion for Application No. PCT/US2013/032648, dated Jul. 24, 2013, 10 pages.
Soto A.M., "Evidence of Absence: Estrogenicity Assessment of a New Food-Contact Coating and the Bispherol Used in Its Synthesis," Environmental Science and technology, 2017, vol. 51 (3), pp. 1718-1726.
Supplementary European Search Report for Application No. 13827098.8, dated Apr. 8, 2016, 7 pages.
Supplementary European Search Report for Application No. 13827829.6, dated Mar. 1, 2016, 6 pages.
Supplementary European Search Report for Application No. 13828612.5, dated Mar. 14, 2016, 6 pages.
Supplementary European Search Report for Application No. 13828613.3, dated Feb. 4, 2016, 4 pages.
U.S. Food and Drug Adminstration, "Bisphenol A (BPA): Use in Food Contact Application," Retrieved from the Internet [URL: www.fda.gov/newsevents/publichealthfocus/ucm064437.htm].
Vogel S., "A Non-Estrogenic Alternative to Bisphenol A at last?," (A blog post dated Jan. 23, 2017), 3 pages.
Grese, T.A. et al. "Selective Estrogen Receptor Modulators (SERMs)", Current Pharmaceutical Design, 4, pp. 71-92 (1998).
Honshu Product List 6, Honshu Chemical Industry Co., Ltd., 2 pages, downloaded on Apr. 23, 2018 at http://www.honshuchemical.co.jp/en/product/list_06.html.

* cited by examiner

STABILIZER AND COATING COMPOSITIONS THEREOF

CROSS REFERENCE TO RELATED APPLICATION

This application is a national stage filing under 35 U.S.C. § 371 of International Application No. PCT/US2013/032639 filed Mar. 15, 2013, which claims priority under 35 U.S.C. § 119 to U.S. Provisional Application No. 61/681,602 filed Aug. 9, 2012, the disclosures of both of which are incorporated herein by reference.

TECHNICAL FIELD

This invention relates to coating compositions that include a thermoplastic dispersion.

BACKGROUND

Conventional container coatings may be derived from a thermally curable formulation that includes particles of a thermoplastic material (typically vinyl chloride polymers such as, for example, polyvinylchloride (PVC)) in an organic solvent. When these coatings are applied to a substrate and cured, the thermoplastic material can degrade and discolor. Degradation products such as, for example, hydrochloric acid (HCl) can attack the substrate. To stabilize the thermoplastic material and reduce degradation, epoxy resins may be added to the coating formulation. The added resins may for example be made by reacting bisphenol A with a polyglycidyl ether of an aromatic polyol such as bisphenol A (often referred to as BADGE).

SUMMARY

There is a desire to reduce or eliminate certain bisphenol A-based compounds commonly used to formulate food-contact coatings.

The present invention provides, in one aspect, a coating composition comprising a thermoplastic dispersion; and an epoxy-functional stabilizer comprising at least one epoxy end group and (i) a polyhydric phenol having one or more aryl or heteroaryl groups in which each aryl or heteroaryl group includes a hydroxyl group attached to the ring and a substituent group (e.g., a "bulky" substituent group) attached to the ring at an ortho or meta position relative to the hydroxyl group, (ii) a polyhydric phenol having two or more aryl or heteroaryl groups joined by a polar linking group or by a linking group having a molecular weight of at least 125 Daltons, or (iii) a polyhydric phenol having the features of both (i) and (ii), the composition being substantially free of polyhydric phenols having estrogenic activity greater than or equal to that of bisphenol S.

The present invention provides, in another aspect, a coating composition comprising a thermoplastic dispersion and an epoxy-functional stabilizer, the stabilizer comprising one or more segments, shown in Formula I:

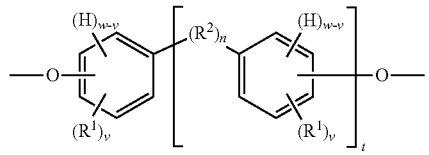

wherein:
H denotes a hydrogen atom, if present;
each $R^1$ is independently an atom or group having an atomic weight of at least 15 Daltons;
each v is independently 0 to 4, more preferably 1 to 4, even more preferably 2 to 4; with the proviso that if v is 0, n is 1 or the phenylene groups depicted in Formula I join to form a fused ring system
w is 4;
$R^2$, if present, is a divalent group;
n is 0 or 1; with the proviso that if n is 0, the phenylene groups depicted in Formula I can optionally join to form a fused ring system in which case w is 3 and v is 0 to 3;
t is 0 or 1; and
$R^2$ is a polar linking group or a linking group having a molecular weight of 125 Daltons with the proviso that if v is 0 and t is 1;
two or more $R^1$ or $R^2$ groups can join to form one or more cyclic groups and wherein the coating composition is preferably substantially free of polyhydric phenols having estrogenic activity greater than or equal to that of bisphenol S.

When t is 1, the segment of Formula I is a segment of the below Formula IA:

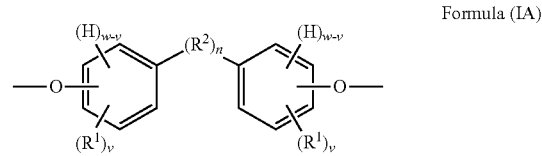

When t is 0, the segment of Formula I is a segment of the below Formula IB.

The present invention provides, in another aspect, a method of making a coated substrate, comprising applying to at least a portion of a metal substrate a coating composition comprising a thermoplastic dispersion and a stabilizer having segments shown in Formula I wherein H, $R^1$ v, w, $R^2$ n and t are as described for Formula I above.

DEFINITIONS

As used herein, "a," "an," "the," "at least one," and "one or more" are used interchangeably. Thus, for example, a coating composition that comprises "a" stabilizer can be interpreted to mean that the coating composition includes "one or more" stabilizers.

The term "acrylic component" includes any compound, polymer, or organic group that includes (meth)acrylate acid or (meth)acrylate monomers, oligomers, polymerizable polymers or copolymers thereof.

The term "bisphenol" refers to a polyhydric polyphenol having two phenylene groups that each includes six-carbon rings and a hydroxyl group attached to a carbon atom of the ring, wherein the rings of the two phenylene groups do not share any atoms in common.

The terms "comprises" and variations thereof do not have a limiting meaning where these terms appear in the description and claims.

The term "crosslinker" refers to a molecule capable of forming a covalent linkage between copolymers (e.g., polymers) or between two different regions of the same copolymer.

The term "easy open end" refers to a can end (typically an end of a food or beverage container) that includes (i) a frangible opening portion (which for some beverage can ends functions as a drinking spout) and (ii) a riveted portion for attaching a pull tab thereto for purposes of opening the frangible opening portion to access the product housed within a can or container.

The terms "estrogenic activity" or "estrogenic agonist activity" refer to the ability of a compound to mimic hormone-like activity through interaction with an endogenous estrogen receptor, typically an endogenous human estrogen receptor.

The term "food-contact surface" refers to a surface of an article (e.g., a food or beverage container) that is in contact with, or suitable for contact with, a food or beverage product.

A group that may be the same or different is referred to as being "independently" something. Substitution on the organic groups of the compounds of the present invention is contemplated. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The term "mobile" when used with respect to a coating composition means that the compound can be extracted from the coating composition when a coating (typically ~1 mg/cm$^2$) is exposed to a test medium for some defined set of conditions, depending on the end use. An example of these testing conditions is exposure of the cured coating to HPLC-grade acetonitrile for 24 hours at 25° C.

The term "on," when used in the context of a coating applied on a surface or substrate, includes both coatings applied directly or indirectly to the surface or substrate.

Thus, for example, a coating applied to a primer layer overlying a substrate constitutes a coating applied on the substrate.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds (e.g., such as a vinyl group). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

The term "organosol" refers to a dispersion of thermoplastic particles in a liquid carrier that includes an organic solvent or a combination of an organic solvent and a plasticizer.

The term "phenylene" as used herein refers to a six-carbon atom aryl ring (e.g., as in a benzene group) that can have any substituent groups (including, e.g., halogens atoms, oxygen atoms, hydrocarbon groups, hydroxyl groups, and the like). Thus, for example, the following aryl groups are each phenylene rings: —C$_6$H$_4$—, —C$_6$H$_3$(CH$_3$)—, and —C$_6$H(CH$_3$)$_2$Cl—. In addition, for example, each of the aryl rings of a naphthalene group is a phenylene ring.

The term "plastisol" refers to a dispersion of thermoplastic particles in a plasticizer.

The term "polyhydric monophenol" refers to a polyhydric phenol that (i) includes an aryl or heteroaryl group (more typically a phenylene group) having at least two hydroxyl groups attached to the aryl or heteroaryl ring and (ii) does not include any other aryl or heteroaryl rings having a hydroxyl group attached to the ring. The term "dihydric monophenol" refers to a polyhydric monophenol that only includes two hydroxyl groups attached to the aryl or heteroaryl ring.

The term "polyhydric phenol" refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

The term "polyhydric polyphenol" (which includes bisphenols) refers to a polyhydric phenol that includes two or more aryl or heteroaryl groups each having at least one hydroxyl group attached to the aryl or heteroaryl ring.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "substantially free" when used with respect to a composition that may contain a particular mobile compound means that the coating composition contains less than 1,000 parts per million (ppm) of the recited mobile compound. The term "essentially free" when used with respect to a composition that may contain a particular mobile compound means that the coating composition contains less than 100 parts per million (ppm) of the recited mobile compound. The term "essentially completely free" when used with respect to a composition that may contain a particular mobile compound means that the coating composition contains less than 5 parts per million (ppm) of the recited mobile compound. The term "completely free" when used with respect to a composition that may contain a particular mobile compound means that the coating composition contains less than 20 parts per billion (ppb) of the recited mobile compound. If the aforementioned phrases are used without the term "mobile" (e.g., "substantially free of BPA compound") then the compositions of the present invention contain less than the aforementioned amount of the compound whether the compound is mobile in the coating or bound to a constituent of the coating.

The term "thermoplastic dispersion," refers to a dispersion of particles (e.g. vinyl chloride polymer particles) in a liquid carrier.

The term "upgrade dihydric phenol" refers to a polyhydric phenol capable of participating in a reaction with the polyepoxide of a polyhydric phenol to build molecular weight and preferably form a polymer.

The term "vinyl organosol," refers to a dispersion of vinyl chloride polymers (preferably high-molecular-weight vinyl chloride polymers) in a liquid carrier.

Also herein, the recitations of numerical ranges by endpoints include all numbers subsumed within that range (e.g., 1 to 5 includes 1, 1.5, 2, 2.75, 3, 3.80, 4, 5, and the like).

DETAILED DESCRIPTION

Disclosed is a stabilizer as well as coating compositions containing the stabilizer. Preferably, the stabilizer, helps in retaining desired coating characteristics (e.g., flexibility, adhesion, and the like) as measured by the Test Methods discussed below. More preferably the stabilizer is a material that is capable of preventing or reducing degradation of a thermoplastic material in the disclosed coating compositions or a cured coating thereof. Even more preferably, the stabilizer may help retain desired coating characteristics and prevent or reduce degradation of the thermoplastic material, but it should be understood that it does not necessarily have to accomplish both. Stabilizers may include monomers, oligomers and polymers of the disclosed polyhydric phenols.

The stabilizer is preferably substantially free or completely free of one or more or all of bisphenol A, bisphenol F, bisphenol S, and epoxide, diepoxide reaction products thereof, having estrogen agonist activity for a human estrogen receptor greater than or equal to that of bisphenol S, greater than or equal to that of 4,4'-(propane-2,2-diyl)bis(2,6-dibromophenol), or greater than or equal to that of 2,2-bis(4-hydroxyphenyl)propanoic acid. In preferred embodiments, the stabilizer is substantially free, more preferably essentially free, even more preferably essentially completely free, and optimally completely free of bisphenol monomers and epoxide reaction products thereof. In some embodiments, the stabilizer is substantially free, more preferably completely free, of any bound polyhydric polyphenol or an epoxide thereof.

The disclosed coating composition includes a thermoplastic dispersion (e.g. thermoplastic particles in a liquid carrier) and preferably an epoxy functionalized stabilizer or more preferably a stabilizer with segments as shown in Formula I. In some embodiments, the stabilizer may include a polymer made from segments of Formula I. In preferred embodiments, the stabilizer may be a polyether polymer. The disclosed coating composition is suitable for contacting food or beverage products.

Examples of suitable thermoplastic materials include halogenated polyolefins, which include, for example, copolymers and homopolymers of vinyl chloride, vinylidenefluoride, polychloroprene, polychloroisoprene, polychlorobutylene, and combinations thereof. PVC is a particularly preferred thermoplastic material. The thermoplastic material preferably has a number average molecular weight ($M_n$) of from about 40,000 to about 300,000; more preferably from about 75,000 to about 200,000; and even more preferably from about 100,000 to about 150,000.

In applications involving packaging coatings, dispersion grade thermoplastic particles are preferably used, where the particles preferably range in particle diameter from greater than about 0 to about 5 microns. Other particle sizes, however, can be used, for example, non-dispersion grade thermoplastic particles that range from about 5 to about 100 microns.

Coating compositions may include at least about 10, at least about 15, or at least about 20 wt. % of thermoplastic material (preferably in the form of particles), based on the total nonvolatile weight of the coating composition. The coating compositions may also include, for example less than about 80, less than about 70, less than about 65 wt. % of thermoplastic material, based on the total nonvolatile weight of the coating composition.

The thermoplastic material may be dispersed in a liquid carrier to form a thermoplastic dispersion. Examples of suitable liquid carriers include organic solvents, a plasticizers, or mixtures thereof. Suitable organic solvents include, for example, polar solvents such as ketones (e.g., MIBK and DIBK), glycol ethers, alcohols, aliphatic hydrocarbons, aromatic hydrocarbons, or mixtures thereof. In some embodiments, it may be advantageous to choose a solvent that can swell the thermoplastic particles to help increase viscosity or both. Preferred carriers have sufficient volatility to evaporate substantially from the coating composition during the curing process.

The disclosed coating composition may for example include at least about 20, preferably at least about 40, and more preferably at least about 45 wt % of solids, based on the total nonvolatile weight of the coating composition. The disclosed coating composition may for example include less than about 95, preferably less than about 80, and more preferably less than about 75 wt-% of solids, based on the total nonvolatile weight of the coating composition.

The disclosed coating composition preferably includes at least about 20, more preferably at least about 30, and even more preferably at least about 35 wt. % of liquid carrier, based on the total weight of the coating composition. The disclosed coating composition preferably includes less than about 65, more preferably less than about 60, and even more preferably less than about 55 wt. % of liquid carrier, based on the total weight of the coating composition.

In some embodiments, the disclosed coating composition is a plastisol. Examples of suitable plasticizers include phosphates, adipates, sebacates, epoxidized oils, polyesters, and combinations thereof.

The disclosed stabilizer preferably does not include any structural units derived from or derivable from the polyhydric phenols bisphenol A ("BPA"), bisphenol F ("BPF") or bisphenol S ("BPS"), and preferably does not include any structural units derived from or derivable from a reaction of such polyhydric phenols with a diepoxide (e.g., structural units derived from BADGE). More preferably, the stabilizer does not include any structural units derived from or derivable from a polyhydric phenol having estrogenic agonist activity greater than or equal to that of BPS. Even more preferably, the stabilizer does not include (e.g., is substantially free or completely free of) any structural units derived from or derivable from a polyhydric phenol having estrogenic agonist activity greater than 4,4'-(propane-2,2-diyl)bis(2,6-dibromophenol). Optimally, the stabilizer does not include any structural units derived from or derivable from a polyhydric phenol having estrogenic agonist activity greater than 2,2-bis(4-hydroxyphenyl)propanoic acid). In still other embodiments, the stabilizer is substantially free, more preferably completely free, of bound bisphenol monomers and epoxides thereof.

While not intending to be bound by theory, it is believed that a polyhydric phenol is less likely to exhibit any appreciable estrogenic agonist activity if the compound's chemical structure is sufficiently different from compounds having estrogenic activity such as diethylstilbestrol. The structures of preferred polyhydric phenol compounds, as will be discussed below, are sufficiently different such that the compounds do not bind and activate a human estrogen receptor. These preferred compounds are, in some instances, at least about 6 or more orders of magnitude less active than diethylstilbestrol (e.g., when assessing estrogenic agonist effect using an in vitro assay such as the MCF-7 cell proliferation assay discussed below). Without being bound by theory, it is believed that such desirable structural dissimilarity can be introduced via one or more structural features, including any suitable combination thereof. For example, it is believed that one or more of the following structural characteristics can be used to achieve such structural dissimilarity:

- steric hindrance (e.g., relative to one or more hydroxyl phenols),
- molecular weight that is arranged in three-dimensional space such that: (i) the compound does not fit, or does not readily fit, in the active site of a human estrogen receptor or (ii) the structural configuration interferes with activation of the human estrogen receptor once inside the active site, and
- the presence of polar groups.

In one embodiment, the stabilizer includes one or more segments of Formula I:

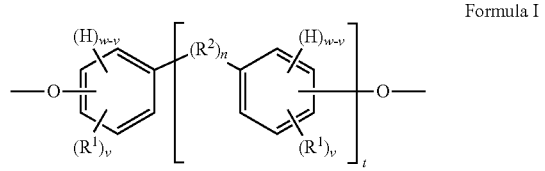

Formula I wherein $R^1$, $R^2$, v, w, n, and t are as described above for Formula I.

When t is 1, the segment of Formula I is a segment of the below Formula IA:

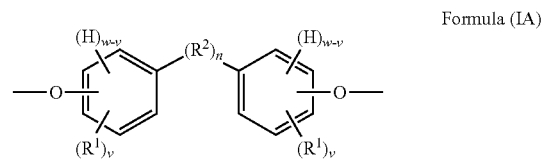

Formula (IA)

When t is 0, the segment of Formula I is a segment of the below Formula IB:

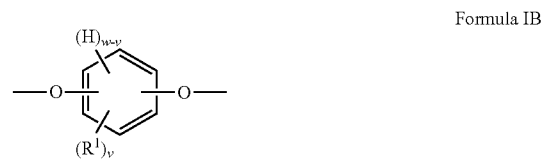

Formula IB

The segments of each of Formulas IA and IB may optionally include one or more additional phenylene or other aryl or heteroaryl groups in addition to those depicted. As depicted in the above Formula I, the segment includes at least one phenylene group when t is 0 (illustrated in Formula IB) and includes at least two phenylene groups when t is 1 (illustrated in Formula IA). Although aryl groups having a six-carbon aromatic ring are presently preferred, it is contemplated that any other suitable aryl or heteroaryl groups may be used in place of the phenylene groups depicted in Formula I. As depicted in the above Formula I, the substituent groups (e.g., —O—, H, $R^1$, and $R^2$) of each phenylene group can be located at any position on the ring relative to one another, although in preferred embodiments at least one $R^1$ is positioned on the ring immediately adjacent to the oxygen atom. In other embodiments in which other aryl or heteroarylene groups are used in place of the depicted phenylene groups in Formula I, it is contemplated that the same would hold true for the substituent groups of such other aryl or heteroarylene groups.

In preferred embodiments, $R^1$ is attached to the phenylene ring at a carbon atom immediately adjacent to the carbon atom to which the depicted oxygen atom is attached. In other words, $R^1$ is preferably located at an ortho position on the ring relative to the oxygen atom. In some embodiments, an $R^1$ is located immediately adjacent to the oxygen on either side. That is, in some embodiments, an $R^1$ is located at each ortho position on the ring relative to the oxygen atom. While not intending to be bound by theory, it is believed that the positioning of one or more $R^1$ groups at an ortho position relative to the oxygen atom depicted in Formula I may be beneficial, for example, in the event that monomer used to make the segment of Formula I is not fully reacted into the stabilizer. Such unreacted monomer could potentially be mobile. The benefits of $R^1$ with regards to an absence of appreciable estrogenic activity in certain such potential mobile compounds are discussed in greater detail below.

While not intending to be bound by theory, it is believed that a polyhydric phenol compound is less likely to exhibit appreciable estrogenic activity if the one or more hydroxyl groups present on each aryl ring (typically phenol hydroxyl groups) are sterically hindered by one or more other substituents of the aryl ring, as compared to a similar polyhydric phenol compound having hydrogen atoms present at each ortho position. It is believed that it may be preferable to have substituent groups positioned at each ortho position relative to the aforementioned hydroxyl groups to provide optimal steric effect to reduce accessibility or reactivity of the hydroxyl group, or both. While it is preferred to position the substituent groups at one or both ortho positions, a sufficiently "bulky" substituent group(s) located at one or both meta positions may also provide the desired effect.

Preferred $R^1$ groups are sufficiently "bulky" to provide a suitable level of steric hindrance for the aforementioned hydroxyl groups to achieve the desired effect. To avoid any ambiguity, the term "group" when used in the context of $R^1$ groups refers to either single atoms (e.g., a halogen atom) or molecules (e.g., two or more atoms). The optimal chemical constituents, size, or configuration (e.g., linear, branched, and the like) of the one or more $R^1$ groups may depend on a variety of factors, including, for example, the location of the $R^1$ group on the aryl group.

Preferred segments of Formula I include one or more $R^1$ groups having an atomic weight of at least 15 Daltons. In some embodiments, the segments of Formula I include one or more $R^1$ groups having an atomic weight of at least 25, at least 40, or at least 50. While the maximum suitable size of $R^1$ is not particularly limited, typically it will be less than 500 Daltons, more typically less than 100 Daltons, and even more typically less than 60 Daltons. Non-limiting examples of $R^1$ groups include groups having at least one carbon atom (e.g., organic groups), halogen atoms, sulfur-containing groups, or any other suitable group that is preferably substantially non-reactive with an epoxy group.

In presently preferred embodiments, one or more $R^1$ groups of each phenylene group includes at least one carbon atom, more preferably 1 to 10 carbon atoms, and even more preferably 1 to 4 carbon atoms. $R^1$ will typically be a saturated or unsaturated hydrocarbon group, more typically saturated, that may optionally include one or more heteroatoms other than carbon or hydrogen atoms for example, N, O, S, Si, a halogen atom, and the like. Examples of suitable hydrocarbon groups may include substituted or unsubstituted groups including alkyl groups (e.g., methyl, ethyl, propyl, butyl groups, and the like, including isomers thereof), alkenyl groups, alkynyl groups, alicyclic groups, aryl groups, or combinations thereof.

In certain preferred embodiments, each phenylene group depicted in Formula I includes at least one alkyl R1 group. As discussed above, any suitable isomer may be used. Thus, for example, a linear butyl group or a branched isomer such as an isobutyl group or a tert-butyl group may be used. In one embodiment, a tert-butyl group (and more preferably a tert-butyl moiety) is a preferred $R^1$ group.

As previously mentioned, it is contemplated that $R^1$ may include one or more cyclic groups. In addition, $R^1$ may form a cyclic or polycyclic group with one or more other $R^1$ groups or $R^2$ or both.

In some embodiments, one or both phenylene groups depicted in Formula I include an $R^1$ group that is a halogen atom located ortho to the oxygen atom, more preferably a higher molecular weight halogen such as bromine or iodine. However, in preferred embodiments, the segment of Formula I does not include any halogen atoms. Moreover, in presently preferred embodiments, the stabilizer including one or more segments of Formula I is preferably free of halogen atoms.

In some embodiments, a suitable $R^1$ is selected and positioned at the ortho position such that a width "f" measured perpendicular from a center-line of the phenylene group (or other suitable aryl group) to the maximal outside extent of the van der Waals volume of $R^1$ (corresponding to the radius of the van der Waals radius of $R^1$) is greater than about 4.5 Angstroms. This width measurement may be determined via theoretical calculation using suitable molecular modeling software and is illustrated below.

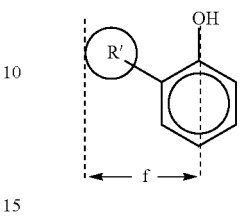

As illustrated above, the centerline for the depicted phenylene group includes the carbon atom to which the phenol hydroxyl group attaches and the para carbon atom. For example, while not intending to be bound by theory, it is believed that it is generally desirable that f be greater than about 4.5 Angstroms if $R^2$ is a —$C(CH_3)_2$— group. In some embodiments $R^1$ may be selected and positioned at an ortho position such that f is less than about 4.5 Angstroms. For example, if $R^2$ is a methylene bridge (—$CH_2$—), then in some embodiments, $R^1$ can be selected and positioned such that f is less than about 4.5 Angstroms. For example, this believed to be the case for certain preferred segments of Formula I derived from, e.g., 4,4'-methylenebis(2,6-dimethylphenol).

$R^2$ is present or absent in the segment of Formula IA depending on whether n is 0 or 1. When $R^2$ is absent in the segment of Formula IA, either (i) a carbon atom of one phenylene ring is covalently attached to a carbon atom of the other phenylene ring (which occurs when w is 4) or (ii) the phenylene groups depicted in Formula IA join to form a fused ring system (which occurs when w is 3 and the two phenylene groups are so fused). In some embodiments, $R^2$ (or the ring-ring covalent linkage if $R^2$ is absent) is preferably attached to at least one, and more preferably both, phenylene rings at a para position (e.g., 1,4 position) relative to the oxygen atom depicted in Formula IA. An embodiment of the segment of Formula IA, in which n is 0, w is 3 and v is independently 0 to 3 such that the two phenylene groups have joined to form a naphthalene group, is depicted below:

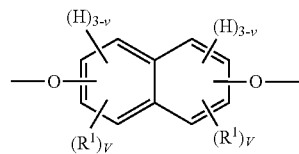

$R^2$ can be any suitable divalent group including, for example, carbon-containing groups (which may optionally include heteroatoms such as, e.g., N, O, P, S, Si, a halogen atom, and the like), sulfur-containing groups (including, e.g., a sulfur atom, a sulfinyl group (—S(O)—), a sulfonyl group (—$S(O_2)$—), and the like), oxygen-containing groups (including, e.g., an oxygen atom, a ketone group, and the like), nitrogen-containing groups, or a combination thereof.

In preferred embodiments of the segment of Formula IA, $R^2$ is present and is typically an organic group containing less than about 15 carbon atoms, and even more typically 1 or 4-15 carbon atoms. In some embodiments, $R^2$ includes 8 or more carbon atoms. $R^2$ will typically be a saturated or unsaturated hydrocarbon group, more typically a saturated divalent alkyl group, and most preferably an alkyl group that does not constrain the movement of the connected phenylene groups in an orientation similar to that of diethylstilbestrol or dienestrol. In some embodiments, $R^2$ may include one or more cyclic groups, which may be aromatic or alicyclic and can optionally include heteroatoms. The one or more optional cyclic groups of $R^2$ can be present, for example, (i) in a chain connecting the two phenylene groups depicted in Formula IA, (ii) in a pendant group attached to a chain connecting the two phenylene groups, or both (i) and (ii).

The atomic weight of the $R^2$ group, if present, may be any suitable atomic weight. Typically, however, $R^2$ has an atomic weight of less than about 500 Daltons, less than about 400 Daltons, less than about 300 Daltons, or less than about 250 Daltons.

In some embodiments, $R^2$ includes a carbon atom that is attached to a carbon atom of each of the phenylene groups depicted in Formula I. For example, $R^2$ can have a structure of the formula —$C(R^7)(R^8)$—, wherein $R^7$ and $R^8$ are each independently a hydrogen atom, a halogen atom, an organic group, a sulfur-containing group, a nitrogen-containing group, or any other suitable group that is preferably substantially non-reactive with an epoxy group, and wherein $R^7$ and $R^8$ can optionally join to form a cyclic group.

In some embodiments, at least one of $R^7$ and $R^8$ is a hydrogen atom, and more preferably both $R^7$ and $R^8$ are hydrogen atoms. In one preferred embodiment, $R^2$ is a divalent methylene group (—$CH_2$—). While not intending to be bound by theory, it is believed that it may be generally desirable to avoid using an $R^2$ group wherein each of $R^7$ and $R^8$ are methyl (—$CH_3$) groups. It may also be generally desirable to avoid using an $R^2$ group in which $R^7$ and $R^8$ join to form a monocyclic cyclohexyl group.

It is also thought to be generally desirable to avoid using either of the following "constrained" unsaturated structures (i) or (ii) as $R^2$: (i) —$C(R^9)$=$C(R^9)$— or (ii)) —$C(=C(R^{10})_y)$—$C(C(R^{10})_y)$—, wherein y is 1 or 2 and each of $R^9$ or $R^{10}$ is independently a hydrogen atom, a halogen atom, an organic group, or a monovalent group. For example, the following unsaturated structures (i) and (ii) are preferably avoided as $R^2$: (i) —$C(CH_2CH_3)$=$C(CH_2CH_3)$— and (ii) —$C(=CHCH_3)$—$C(=CHCH_3)$—.

While not intending to be bound by theory it is believed that a suitably low atomic weight $R^2$ group such as, e.g., —$CH_2$— (14 Daltons), can help avoid estrogenic activity. In some embodiments where $R^2$ is a —$C(R^7)(R^8)$— group, it may be desirable that $R^2$ have an atomic weight of less than 42 Daltons or less than 28 Daltons. It is also believed that a suitably high atomic weight $R^2$ can also help interfere with the ability of a dihydric phenol to function as an agonist for a human estrogen receptor. In some embodiments where $R^2$ is a —$C(R^7)(R^8)$— group, it may be desirable that $R^2$ have an atomic weight that is greater than about: 125, 150, 175, or 200 Daltons. By way of example, a polyhydric phenol compound has been determined to be appreciably non-estrogenic that: (a) is not "hindered" (e.g. no ortho substituents; v=0)) and (b) has an $R^2$ group in the form of —$C(R^7)(R^8)$— having an atomic weight greater than 200 Daltons.

While not intending to be bound to theory, preferred $R^2$ groups include divalent groups that promote that the orientation of a polyhydric phenol compound in a three-dimensional configuration that is sufficiently different from 17β-estradiol or other compounds (e.g., diethylstilbestrol) having estrogenic activity. For example, while not intending to be bound to theory, it is believed that the presence of $R^2$ as an unsubstituted methylene bridge (—$CH_2$—) can contribute to the reduction or elimination of estrogenic activity. It is also contemplated that a singly substituted methylene bridge having one hydrogen attached to the central carbon atom of the methylene bridge (—$C(R^7)(H)$—; see, e.g. the $R^2$ group of 4,4'-butylidenebis(2-t-butyl-5-methylphenol)) may also contribute such a beneficial effect, albeit perhaps to a lesser extent.

In some embodiments, $R^2$ is of the formula —$C(R^7)(R^8)$— wherein $R^7$ and $R^8$ form a ring that includes one or more heteroatoms. In one such embodiment, the ring formed by $R^7$ and $R^8$ further includes one or more additional cyclic groups such as, e.g., one or more aryl cyclic groups (e.g., two phenylene rings).

In one embodiment, $R^2$ is of the formula —$C(R^7)(R^8)$— wherein at least one of $R^7$ and $R^8$ form a ring with an $R^1$ of the depicted phenylene group. In one such embodiment, each of $R^7$ and $R^8$ forms such a ring with a different depicted phenylene group.

The oxygen atom of a phenylene rings depicted in Formula I can be positioned on the ring at any position relative to $R^2$ (or relative to the other phenylene ring if $R^2$ is absent). In some embodiments, the oxygen atom (which is preferably an ether oxygen) and $R^2$ are located at para positions relative to one another. In other embodiments, the oxygen atom and R2 may be located ortho or meta to one another.

In preferred embodiments, the substituted phenylene groups of Formula I are symmetric relative to one another. Stated otherwise, the substituted phenylene groups are preferably formed from the same phenol compound, thereby resulting in the same substituent groups on each ring located at the same ring positions. An example of a compound having symmetric phenylene groups is provided below.

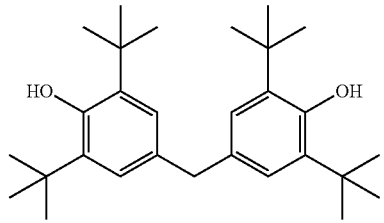 [SMILES: CC(C)(C)c1cc(Cc2cc(C(C)(C)C)c(O)c(C(C)(C)C)c2)cc(C(C)(C)C)c1O]

An example of a compound having phenylene groups that are not symmetric is provided below, in which a methyl group is at a meta position on one ring and at an ortho position on the other.

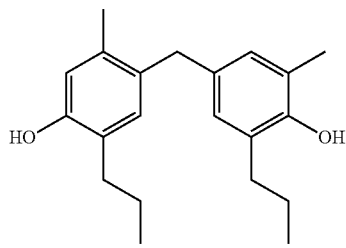 [SMILES: CCCc1cc(Cc2cc(C)c(O)c(CCC)c2)c(C)cc1O]

In preferred embodiments, the disclosed stabilizer includes a plurality of segments of Formula I, which are preferably dispersed throughout a backbone of the polymer, more preferably a polyether backbone. In preferred embodiments, the segments of Formula I constitute a substantial portion of the overall mass of the stabilizer.

The stabilizer may be derived from polyhydric phenol compound depicted in the below Formula II, wherein $R^1$, $R^2$, n, t, v, and w are as in Formula I:

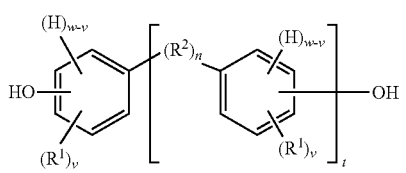

Formula II

When t is 1, the compound of Formula II is of the below Formula IIA:

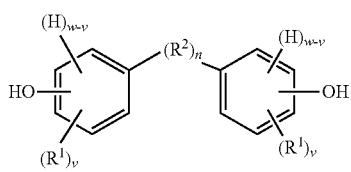

Formula IIA

When t is 0, the compound of Formula II is of the below Formula IIB:

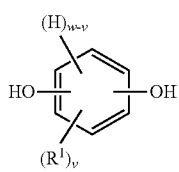

Formula (IIB)

Examples of dihydric monophenol compounds of Formula IIB include catechol and substituted catechols (e.g., 3-methylcatechol, 4-methylcatechol, 4-tert-butyl catechol, and the like); hydroquinone and substituted hydroquinones (e.g., methylhydroquinone, 2,5-dimethylhydroquinone, trimethylhydroquinone, tetramethylhydroquinone, ethylhydroquinone, 2,5-diethylhydroquinone, triethylhydroquinone, tetraethylhydroquinone, tert-butylhydroquionine, 2,5-di-tert-butylhydroquinone, and the like); resorcinol and substituted resorcinols (e.g., 2-methylresorcinol, 4-methyl resorcinol, 2,5-dimethylresorcinol, 4-ethylresorcinol, 4-butylresorcinol, 4,6-di-tert-butylresorcinol, 2,4,6-tri-tert-butylresorcinol, and the like); and variants and mixtures thereof.

Preferred compounds of Formula II do not exhibit appreciable estrogenic activity. Preferred appreciably non-estrogenic compounds exhibit a degree of estrogen agonist activity, in a competent in vitro human estrogen receptor assay, that is preferably less than that exhibited by 4,4'-(propane-2,2-diyl)polyhydric phenol in the assay, even more preferably less than that exhibited by bisphenol S in the assay, even more preferably less than that exhibited by 4,4'-(propane-2,2-diyl)bis(2,6-dibromophenol) in the assay, and optimally less than about that exhibited by 2,2-bis(4-hydroxyphenyl)propanoic acid in the assay. It has been found that compounds such as 4,4'-methylenebis(2,6-di-t-butylphenol), 2,2'-methylenebis(4-methyl-6-t-butylphenol), 4,4'-methylenebis(2,6-dimethylphenol), 4,4'butylidenebis(2-t-butyl-5-methylphenol), and 2,5-di-t-butylhydroquinone do not exhibit appreciable estrogenic activity in a suitable in vitro assay whose results are known to be directly correlated to the results of the MCF-7 cell proliferation assay ("MCF-7 assay") through analysis of common reference compounds.

The MCF-7 assay is a useful test for assessing whether a polyhydric phenol compound is appreciably non-estrogenic. The MCF-7 assay uses MCF-7, clone WS8 cells to measure whether and to what extent a substance induces cell proliferation via estrogen receptor (ER)-mediated pathways. The method is described in "Test Method Nomination: MCF-7 Cell Proliferation Assay of Estrogenic Activity" submitted for validation by CertiChem, Inc. to the National Toxicology Program Interagency Center for the Evaluation of Alternative Toxicological Methods (NICEATM) on Jan. 19, 2006 (available online at iccvam.niehs.nih.gov/methods/endocrine/endodocs/SubmDoc.pdf).

A brief summary of the method of the aforementioned MCF-7 assay is provided below. MCF-7, clone WS8 cells are maintained at 37° C. in RMPI (Roswell Park Memorial Institute medium) containing Phenol Red (e.g., GIBCO Catalog Number 11875119) and supplemented with the indicated additives for routine culture. An aliquot of cells maintained at 37° C. are grown for two days in phenol-free media containing 5% charcoal stripped fetal bovine serum in a 25 cm$^2$ tissue culture flask. Using a robotic dispenser such as an EPMOTION™ 5070 unit, MCF-7 cells are then seeded at 400 cells per well in 0.2 ml of hormone-free culture medium in Corning 96-well plates. The cells are adapted for 3 days in the hormone-free culture medium prior to adding the chemical to be assayed for estrogenic activity. The media containing the test chemical is replaced daily for 6 days. At the end of the 7 day exposure to the test chemical, the media is removed, the wells are washed once with 0.2 ml of HBSS (Hanks' Balanced Salt Solution), and then assayed to quantify amounts of DNA per well using a micro-plate modification of the Burton diphenylamine (DPA) assay, which is used to calculate the level of cell proliferation.

Examples of appreciably non-estrogenic polyhydric phenols include polyhydric phenols that, when tested using the MCF-7 assay, exhibit a Relative Proliferative Effect ("RPE") having a logarithmic value (with base 10) of less than about −2.0, more preferably an RPE of −3 or less, and even more preferably an RPE of −4 or less. RPE is the ratio between the EC50 of the test chemical and the EC50 of the control substance 17-beta estradiol times 100, where EC50 is "effective concentration 50%" or half-maximum stimulation concentration for cell proliferation measured as total DNA in the MCF-7 assay.

Table 1 shown below includes exemplary preferred polyhydric phenol compounds of Formula II and their expected or measured logarithmic RPE values in the MCF-7 assay.

TABLE 1

| Polyhydric Compound of Formula II | Structure | Reference Compound | Log RPE |
|---|---|---|---|
|  |  | 17β-estradiol | 2.00 |
|  |  | diethylstilbestrol | about 2 |
|  |  | dienestrol | about 2 |
|  |  | Genistein | −2 |
|  |  | Bisphenol S | −2 |
|  |  | Bisphenol F | −2 |

TABLE 1-continued

| Polyhydric Compound of Formula II | Structure | Reference Compound | Log RPE |
|---|---|---|---|
| 4,4'-isopropylidenebis(2,6-dimethylphenol) | 1 | | −2 |
| 4,4'-(propane-2,2-diyl)bis(2,6-dibromophenol) | 16 | | −3 |
| 4,4'-(ethane-1,2-diyl)bis(2,6-dimethylphenol) | 2 | | −3 |
| 4,4',4''-(ethane-1,1,1-triyl)triphenol | 3 | | −3 |
| 4,4'-(1-phenylethane-1,1-diyl)polyhydric phenol | 4 | | −3 |
| 2,2-bis(4-hydroxyphenyl)propanoic acid | 5 | | less than −4 |
| 4,4'-methylenebis(2,6-dimethylphenol) | 6 | | less than −4 |
| 4,4'-butylidenebis(2-t-butyl-5-methylphenol) | 7 | | less than −4 |
| 4,4'-methylenebis(2,6-di-t-butylphenol) | 8 | | less than −4 |
| 2,2'-methylenebis(4-methyl-6-t-butylphenol) | 9 | | less than −4 |
| 4,4'-(1,4-phenylenebis(propane-2,2-diyl))polyhydric phenol | 10 | | less than −4 |
| 2,2'methylenebis(phenol) | 11 | | less than −4 |
| 2,5-di-t-butylhydroquinone | 12 | | less than −4 |
| 2,2'-Methylenebis(6-(1-methylcyclohexyl)-4-methylphenol) | 13 | | less than −4 |
| 2,2'-Methylenebis(6-t-butyl-4-methylphenol) | 14 | | less than −4 |
| 2,2'Methylenebis(4-ethyl-6-t-butylphenol) | 15 | | less than −4 |

Structures 1 through 16 as identified in Table 1 are also shown below:

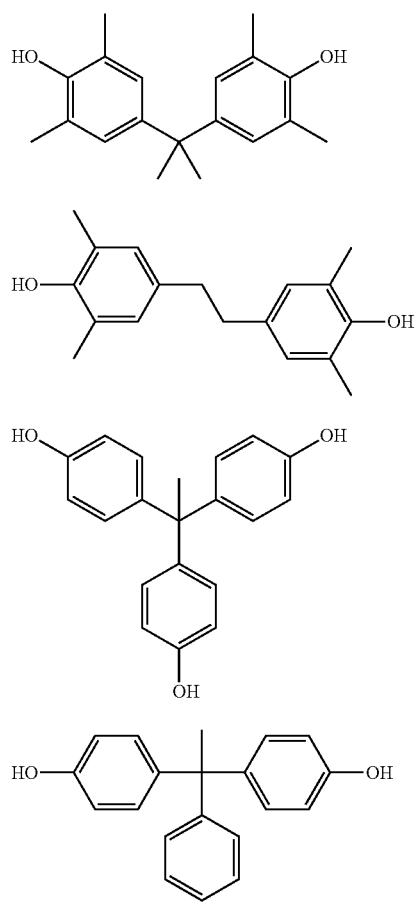
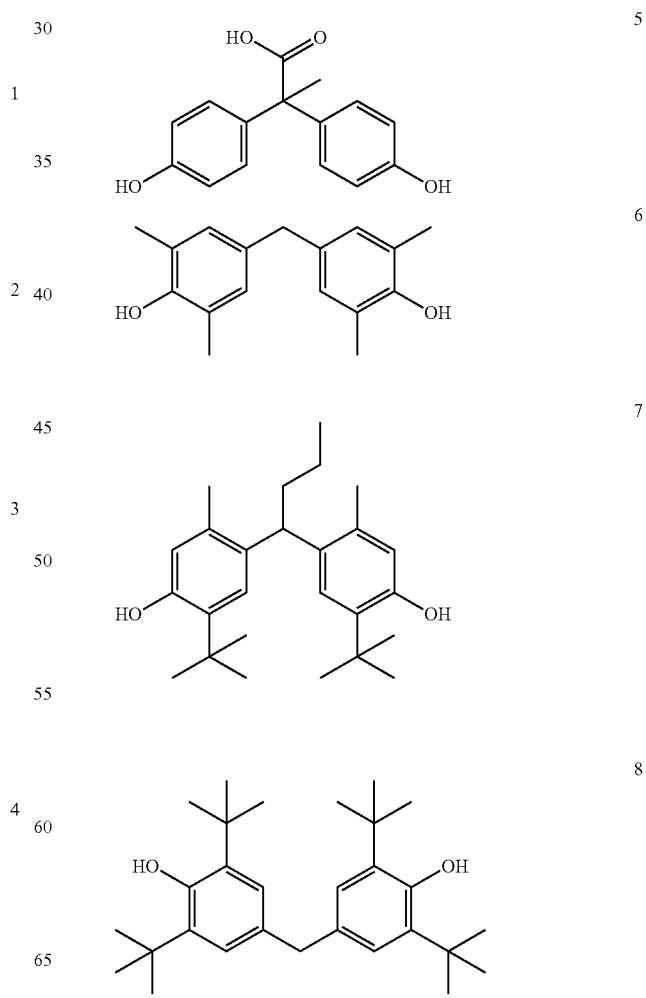

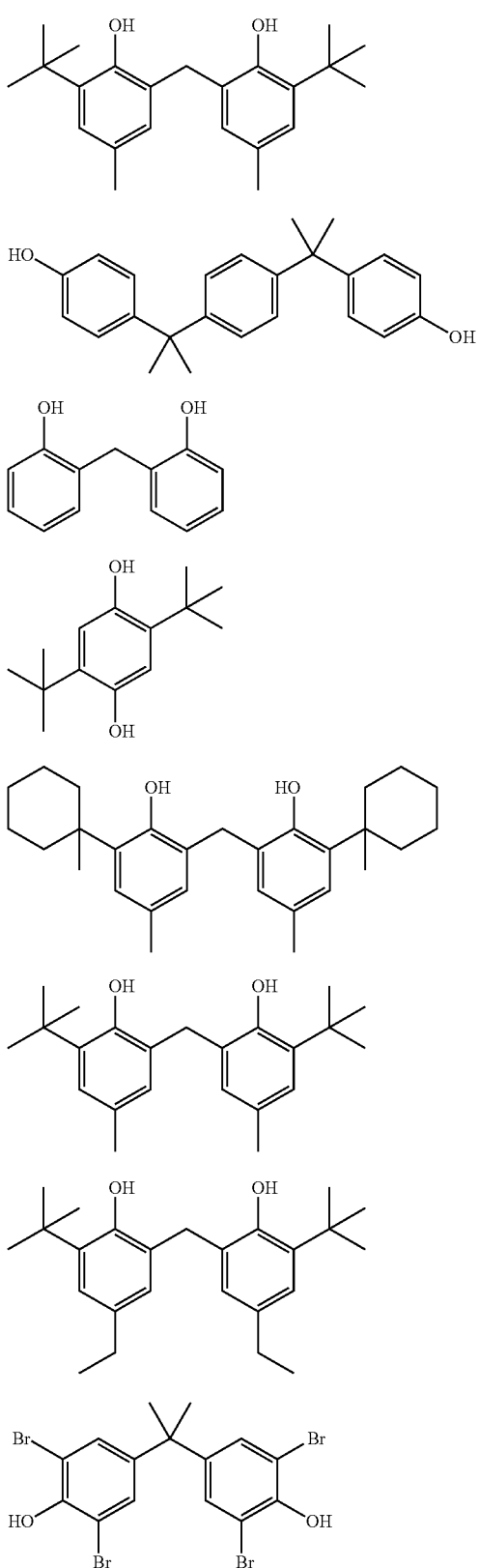

Compounds having no appreciable estrogenic activity may be beneficial in the event that any unreacted, residual compound may be present in a cured coating composition.

While the balance of scientific data does not indicate that the presence in such coating compositions of very small amounts of residual compounds having estrogenic activity (as measured, for example, in an in vitro recombinant cell assay) pose a human health concern, the use of compounds having no appreciable estrogenic activity in such an assay may nonetheless be desirable from a public perception standpoint. Thus, in preferred embodiments, the disclosed stabilizer is preferably formed using polyhydric phenol compounds that do not exhibit appreciable estrogenic activity in the MCF-7 test.

While not intending to be bound by theory, as previously discussed, it is believed that the presence of substituent groups (e.g., a group other than a hydrogen atom) at one or more of the ortho or meta positions of each phenylene ring of the Formula II compound, relative to the phenol hydroxyl group of each ring, can reduce or effectively eliminate any estrogenic activity. It is believed that the inhibition/elimination of estrogenic activity may be attributable to one or more of the following: (a) steric hindrance of the phenol hydroxyl group (which may cause the overall polyhydric phenol structure to be sufficiently different from estrogenically active compounds such as diethylstilbestrol), (b) the compound having an increased molecular weight due to the presence of the one or more substituent groups, (c) the presence of polar groups or (d) ortho hydroxyl groups relative to $R^2$. Substitution at one or both of the ortho positions of each phenylene ring is presently preferred for certain embodiments as it is believed that ortho substitution can provide the greatest steric hindrance for the hydroxyl group or ether linkage.

As previously discussed, structural features other than the presence of suitable $R^1$ groups (e.g., features such as (b), (c), and (d) of the preceding paragraph) are believed to inhibit or eliminate estrogenic activity, even in the absence of any $R^1$ groups.

It is believed that molecular weight may be a structural characteristic pertinent to whether a polyhydric phenol is appreciably non-estrogenic. For example, while not intending to be bound by theory, it is believed that if a sufficient amount of relatively "densely" packed molecular weight is present in a polyhydric phenol, it can prevent the compound from being able to fit into the active site of an estrogen receptor (irrespective of whether the polyhydric phenol includes any ortho or meta $R^1$ groups). In some embodiments, it may be beneficial to form a stabilizer from one or more polyhydric phenols (whether "hindered" or not) that includes at least the following number of carbon atoms: 20, 21, 22, 23, 24, 25, or 26 carbon atoms. In one such embodiment, a polyhydric phenol of Formula II is used to make the stabilizer, where (a) v is independently 0 to 4 and (b) $R^2$ is of the formula —$C(R^7)(R^8)$— and includes at least 8, at least 10, at least 12, or at least 14 carbon atoms (or otherwise has an $R^2$— of sufficiently high atomic weight to prevent the compound from fitting into the active site).

The presence of one or more polar groups on the polyhydric phenol compounds of Formula II may be beneficial in certain embodiments, particularly for certain embodiments of Formula IIA. The polar groups may be located at any suitable location of the compounds of Formula II, including in $R^1$ or $R^2$. Suitable polar groups may include ketone, carboxyl, carbonate, hydroxyl, phosphate, sulfoxide, and the like, any other polar groups disclosed herein, and combinations thereof.

The below compounds of Formula II may also be used in certain embodiments if desired.

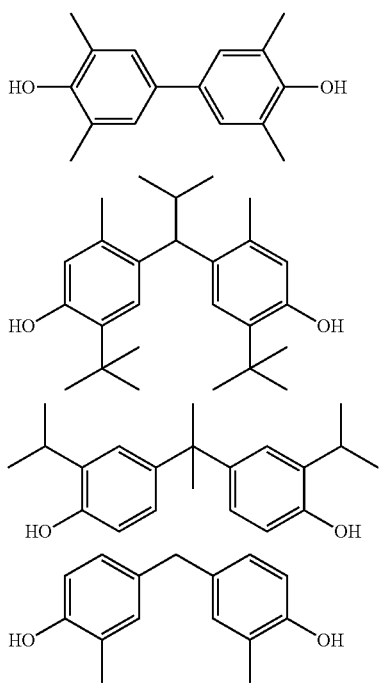

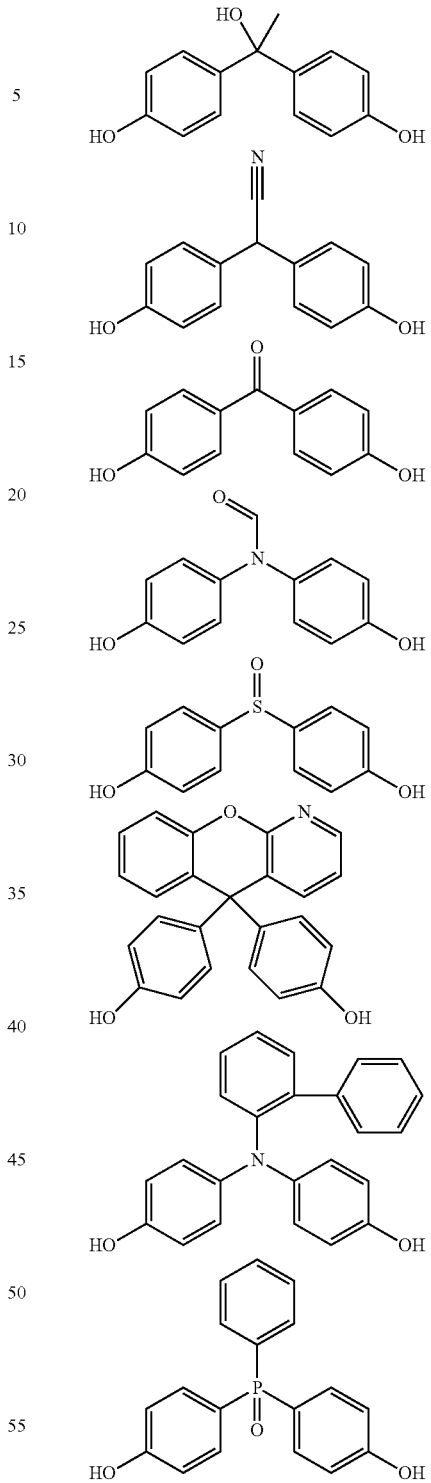

The below compounds are not presently preferred, but may be used in certain embodiments, if desired.

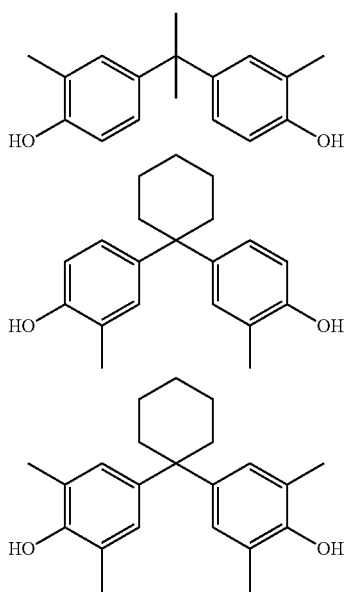

Additional polyhydric phenol compounds that may have utility in producing the stabilizer are provided below. While the polyhydric phenol structures listed below are not "hindered" in the sense of having bulky substituent groups at one or more ortho or meta positions of the phenylene ring(s), it is contemplated that each of the below polyhydric phenol structures may be used in place of, or in addition to, the compounds of Formula II. Such compounds are believed to be appreciably non-estrogenic for one or more of the reasons previously described herein.

Segments of Formula I and compounds of Formula II wherein each of the depicted phenylene groups include one or two ortho $R^1$ groups (relative to the depicted oxygen atom) are presently preferred. To further illustrate such structures, Table 2 shown below exemplifies some non-limiting combinations of one or more ortho $R^1$ and $R^2$, if present, for a given phenylene group. Table 2 is non-limiting with respect to the ring position of $R^2$ (e.g., ortho, meta, para), although typically $R^2$, if present, will be located at a para position relative to the oxygen atom. The columns labeled "Ortho Position A" and "Ortho Position B" indicate the $R^1$ group present at each ortho position of the phenylene group (assuming $R^2$ is not located at an ortho position). Positions "A" or "B" can be either ortho position relative to the depicted oxygen atom. If $R^2$ is located at an ortho position of the phenylene group, then the group listed in the "Ortho Position B" column is not present. Typically, though not required, the phenylene groups in a given segment of Formula I or compound of Formula II or III will be "symmetric" relative to the second phenylene group such that the same ortho group (as delineated in the ortho position column "A" or "B") is located on each ring at the same ortho position.

Table 2 is also intended as a listing of independent examples of $R^1$ or $R^2$, as well as examples of combinations of $R^1$ and $R^2$ (regardless of whether $R^1$ is ortho or meta relative to the oxygen atom, whether other $R^1$ are present in a particular phenylene group, or whether the one or more W are the same for both of the phenylene groups).

TABLE 2

| Ortho Position "A" | Ortho Position "B" | $R^2$ |
|---|---|---|
| Butyl | Hydrogen | 2-Butylidene |
| Butyl | Methyl | 2-Butylidene |
| Butyl | Ethyl | 2-Butylidene |
| Butyl | Propyl | 2-Butylidene |
| Butyl | isopropyl | 2-Butylidene |
| Butyl | Butyl | 2-Butylidene |
| Ethyl | Hydrogen | 2-Butylidene |
| Ethyl | Methyl | 2-Butylidene |
| Ethyl | Ethyl | 2-Butylidene |
| Isopropyl | Hydrogen | 2-Butylidene |
| Isopropyl | Methyl | 2-Butylidene |
| Isopropyl | Ethyl | 2-Butylidene |
| Isopropyl | Propyl | 2-Butylidene |
| Isopropyl | isopropyl | 2-Butylidene |
| Methyl | Hydrogen | 2-Butylidene |
| Methyl | Methyl | 2-Butylidene |
| Propyl | Hydrogen | 2-Butylidene |
| Propyl | Methyl | 2-Butylidene |
| Propyl | Ethyl | 2-Butylidene |
| Propyl | Propyl | 2-Butylidene |
| sec-Butyl | Hydrogen | 2-Butylidene |
| sec-Butyl | Methyl | 2-Butylidene |
| sec-Butyl | Ethyl | 2-Butylidene |
| sec-Butyl | Propyl | 2-Butylidene |
| sec-Butyl | isopropyl | 2-Butylidene |
| sec-Butyl | Butyl | 2-Butylidene |
| sec-Butyl | sec-Butyl | 2-Butylidene |
| tert-Butyl | Hydrogen | 2-Butylidene |
| tert-Butyl | Methyl | 2-Butylidene |
| tert-Butyl | Ethyl | 2-Butylidene |
| tert-Butyl | Propyl | 2-Butylidene |
| tert-Butyl | isopropyl | 2-Butylidene |
| tert-Butyl | Butyl | 2-Butylidene |
| tert-Butyl | sec-Butyl | 2-Butylidene |
| tert-Butyl | tert-Butyl | 2-Butylidene |
| Butyl | Hydrogen | Butylene |
| Butyl | Methyl | Butylene |
| Butyl | Ethyl | Butylene |
| Butyl | Propyl | Butylene |
| Butyl | isopropyl | Butylene |
| Butyl | Butyl | Butylene |
| Ethyl | Hydrogen | Butylene |
| Ethyl | Methyl | Butylene |
| Ethyl | Ethyl | Butylene |
| Isopropyl | Hydrogen | Butylene |
| Isopropyl | Methyl | Butylene |
| Isopropyl | Ethyl | Butylene |
| Isopropyl | Propyl | Butylene |
| Isopropyl | isopropyl | Butylene |
| Methyl | Hydrogen | Butylene |
| Methyl | Methyl | Butylene |
| Propyl | Hydrogen | Butylene |
| Propyl | Methyl | Butylene |
| Propyl | Ethyl | Butylene |
| Propyl | Propyl | Butylene |
| sec-Butyl | Hydrogen | Butylene |
| sec-Butyl | Methyl | Butylene |
| sec-Butyl | Ethyl | Butylene |
| sec-Butyl | Propyl | Butylene |
| sec-Butyl | isopropyl | Butylene |
| sec-Butyl | Butyl | Butylene |
| sec-Butyl | sec-Butyl | Butylene |
| tert-Butyl | Hydrogen | Butylene |
| tert-Butyl | Methyl | Butylene |
| tert-Butyl | Ethyl | Butylene |
| tert-Butyl | Propyl | Butylene |
| tert-Butyl | isopropyl | Butylene |
| tert-Butyl | Butyl | Butylene |
| tert-Butyl | sec-Butyl | Butylene |
| tert-Butyl | tert-Butyl | Butylene |
| Butyl | Hydrogen | Ethylidene |
| Butyl | Methyl | Ethylidene |
| Butyl | Ethyl | Ethylidene |
| Butyl | Propyl | Ethylidene |
| Butyl | isopropyl | Ethylidene |
| Butyl | Butyl | Ethylidene |
| Ethyl | Hydrogen | Ethylidene |
| Ethyl | Methyl | Ethylidene |
| Ethyl | Ethyl | Ethylidene |
| Isopropyl | Hydrogen | Ethylidene |
| Isopropyl | Methyl | Ethylidene |
| Isopropyl | Ethyl | Ethylidene |
| Isopropyl | Propyl | Ethylidene |
| Isopropyl | isopropyl | Ethylidene |
| Methyl | Hydrogen | Ethylidene |
| Methyl | Methyl | Ethylidene |
| Propyl | Hydrogen | Ethylidene |
| Propyl | Methyl | Ethylidene |
| Propyl | Ethyl | Ethylidene |
| Propyl | Propyl | Ethylidene |
| sec-Butyl | Hydrogen | Ethylidene |
| sec-Butyl | Methyl | Ethylidene |
| sec-Butyl | Ethyl | Ethylidene |
| sec-Butyl | Propyl | Ethylidene |
| sec-Butyl | isopropyl | Ethylidene |
| sec-Butyl | Butyl | Ethylidene |
| sec-Butyl | sec-Butyl | Ethylidene |
| tert-Butyl | Hydrogen | Ethylidene |
| tert-Butyl | Methyl | Ethylidene |
| tert-Butyl | Ethyl | Ethylidene |
| tert-Butyl | Propyl | Ethylidene |
| tert-Butyl | isopropyl | Ethylidene |
| tert-Butyl | Butyl | Ethylidene |
| tert-Butyl | sec-Butyl | Ethylidene |
| tert-Butyl | tert-Butyl | Ethylidene |
| Butyl | Hydrogen | Methylidene |
| Butyl | Methyl | Methylidene |
| Butyl | Ethyl | Methylidene |
| Butyl | Propyl | Methylidene |
| Butyl | isopropyl | Methylidene |
| Butyl | Butyl | Methylidene |
| Ethyl | Hydrogen | Methylidene |
| Ethyl | Methyl | Methylidene |
| Ethyl | Ethyl | Methylidene |
| Isopropyl | Hydrogen | Methylidene |
| Isopropyl | Methyl | Methylidene |
| Isopropyl | Ethyl | Methylidene |
| Isopropyl | Propyl | Methylidene |
| Isopropyl | isopropyl | Methylidene |
| Methyl | Hydrogen | Methylidene |
| Methyl | Methyl | Methylidene |
| Propyl | Hydrogen | Methylidene |
| Propyl | Methyl | Methylidene |
| Propyl | Ethyl | Methylidene |
| Propyl | Propyl | Methylidene |
| sec-Butyl | Hydrogen | Methylidene |
| sec-Butyl | Methyl | Methylidene |
| sec-Butyl | Ethyl | Methylidene |
| sec-Butyl | Propyl | Methylidene |
| sec-Butyl | isopropyl | Methylidene |

TABLE 2-continued

| Ortho Position "A" | Ortho Position "B" | R² |
|---|---|---|
| sec-Butyl | Butyl | Methylidene |
| sec-Butyl | sec-Butyl | Methylidene |
| tert-Butyl | Hydrogen | Methylidene |
| tert-Butyl | Methyl | Methylidene |
| tert-Butyl | Ethyl | Methylidene |
| tert-Butyl | Propyl | Methylidene |
| tert-Butyl | isopropyl | Methylidene |
| tert-Butyl | Butyl | Methylidene |
| tert-Butyl | sec-Butyl | Methylidene |
| tert-Butyl | tert-Butyl | Methylidene |
| Butyl | Hydrogen | Propylidene |
| Butyl | Methyl | Propylidene |
| Butyl | Ethyl | Propylidene |
| Butyl | Propyl | Propylidene |
| Butyl | isopropyl | Propylidene |
| Butyl | Butyl | Propylidene |
| Ethyl | Hydrogen | Propylidene |
| Ethyl | Methyl | Propylidene |
| Ethyl | Ethyl | Propylidene |
| Isopropyl | Hydrogen | Propylidene |
| Isopropyl | Methyl | Propylidene |
| Isopropyl | Ethyl | Propylidene |
| Isopropyl | Propyl | Propylidene |
| Isopropyl | isopropyl | Propylidene |
| Methyl | Hydrogen | Propylidene |
| Methyl | Methyl | Propylidene |
| Propyl | Hydrogen | Propylidene |
| Propyl | Methyl | Propylidene |
| Propyl | Ethyl | Propylidene |
| Propyl | Propyl | Propylidene |
| sec-Butyl | Hydrogen | Propylidene |
| sec-Butyl | Methyl | Propylidene |
| sec-Butyl | Ethyl | Propylidene |
| sec-Butyl | Propyl | Propylidene |
| sec-Butyl | isopropyl | Propylidene |
| sec-Butyl | Butyl | Propylidene |
| sec-Butyl | sec-Butyl | Propylidene |
| tert-Butyl | Hydrogen | Propylidene |
| tert-Butyl | Methyl | Propylidene |
| tert-Butyl | Ethyl | Propylidene |
| tert-Butyl | Propyl | Propylidene |
| tert-Butyl | isopropyl | Propylidene |
| tert-Butyl | Butyl | Propylidene |
| tert-Butyl | sec-Butyl | Propylidene |
| tert-Butyl | tert-Butyl | Propylidene |
| Butyl | Hydrogen | 1-Phenylethylidene |
| Butyl | Methyl | 1-Phenylethylidene |
| Butyl | Ethyl | 1-Phenylethylidene |
| Butyl | Propyl | 1-Phenylethylidene |
| Butyl | isopropyl | 1-Phenylethylidene |
| Butyl | Butyl | 1-Phenylethylidene |
| Ethyl | Hydrogen | 1-Phenylethylidene |
| Ethyl | Methyl | 1-Phenylethylidene |
| Ethyl | Ethyl | 1-Phenylethylidene |
| Isopropyl | Hydrogen | 1-Phenylethylidene |
| Isopropyl | Methyl | 1-Phenylethylidene |
| Isopropyl | Ethyl | 1-Phenylethylidene |
| Isopropyl | Propyl | 1-Phenylethylidene |
| Isopropyl | isopropyl | 1-Phenylethylidene |
| Methyl | Hydrogen | 1-Phenylethylidene |
| Methyl | Methyl | 1-Phenylethylidene |
| Propyl | Hydrogen | 1-Phenylethylidene |
| Propyl | Methyl | 1-Phenylethylidene |
| Propyl | Ethyl | 1-Phenylethylidene |
| Propyl | Propyl | 1-Phenylethylidene |
| sec-Butyl | Hydrogen | 1-Phenylethylidene |
| sec-Butyl | Methyl | 1-Phenylethylidene |
| sec-Butyl | Ethyl | 1-Phenylethylidene |
| sec-Butyl | Propyl | 1-Phenylethylidene |
| sec-Butyl | isopropyl | 1-Phenylethylidene |
| sec-Butyl | Butyl | 1-Phenylethylidene |
| sec-Butyl | sec-Butyl | 1-Phenylethylidene |
| tert-Butyl | Hydrogen | 1-Phenylethylidene |
| tert-Butyl | Methyl | 1-Phenylethylidene |
| tert-Butyl | Ethyl | 1-Phenylethylidene |
| tert-Butyl | Propyl | 1-Phenylethylidene |
| tert-Butyl | isopropyl | 1-Phenylethylidene |
| tert-Butyl | Butyl | 1-Phenylethylidene |
| tert-Butyl | sec-Butyl | 1-Phenylethylidene |
| tert-Butyl | tert-Butyl | 1-Phenylethylidene |
| Butyl | Hydrogen | Diphenylmethylidene |
| Butyl | Methyl | Diphenylmethylidene |
| Butyl | Ethyl | Diphenylmethylidene |
| Butyl | Propyl | Diphenylmethylidene |
| Butyl | isopropyl | Diphenylmethylidene |
| Butyl | Butyl | Diphenylmethylidene |
| Ethyl | Hydrogen | Diphenylmethylidene |
| Ethyl | Methyl | Diphenylmethylidene |
| Ethyl | Ethyl | Diphenylmethylidene |
| Isopropyl | Hydrogen | Diphenylmethylidene |
| Isopropyl | Methyl | Diphenylmethylidene |
| Isopropyl | Ethyl | Diphenylmethylidene |
| Isopropyl | Propyl | Diphenylmethylidene |
| Isopropyl | isopropyl | Diphenylmethylidene |
| Methyl | Hydrogen | Diphenylmethylidene |
| Methyl | Methyl | Diphenylmethylidene |
| Propyl | Hydrogen | Diphenylmethylidene |
| Propyl | Methyl | Diphenylmethylidene |
| Propyl | Ethyl | Diphenylmethylidene |
| Propyl | Propyl | Diphenylmethylidene |
| sec-Butyl | Hydrogen | Diphenylmethylidene |
| sec-Butyl | Methyl | Diphenylmethylidene |
| sec-Butyl | Ethyl | Diphenylmethylidene |
| sec-Butyl | Propyl | Diphenylmethylidene |
| sec-Butyl | isopropyl | Diphenylmethylidene |
| sec-Butyl | Butyl | Diphenylmethylidene |
| sec-Butyl | sec-Butyl | Diphenylmethylidene |
| tert-Butyl | Hydrogen | Diphenylmethylidene |
| tert-Butyl | Methyl | Diphenylmethylidene |
| tert-Butyl | Ethyl | Diphenylmethylidene |
| tert-Butyl | Propyl | Diphenylmethylidene |
| tert-Butyl | isopropyl | Diphenylmethylidene |
| tert-Butyl | Butyl | Diphenylmethylidene |
| tert-Butyl | sec-Butyl | Diphenylmethylidene |
| tert-Butyl | tert-Butyl | Diphenylmethylidene |

The segments of Formula I may be incorporated into the disclosed stabilizer by a variety of methods. In one embodiment, the stabilizer is formed using reactants that include at least one polyepoxide compound, more typically at least one diepoxide compound. Although any suitable ingredients may be used to form the stabilizer, in presently preferred embodiments, the stabilizer is formed via reaction of ingredients that include: (a) one or more polyepoxides, more preferably one or more diepoxides, and (b) one or more polyols, more preferably one or more polyhydric phenols, and even more preferably one or more dihydric phenols. The stabilizer is preferably derived from ingredients including a diepoxide having one or more "hindered" aryl or heteroaryl groups, and more preferably one or more "hindered" phenylene groups described herein (e.g., as depicted in Formula I).

The epoxy group or oxirane groups of the polyepoxide may be attached via any suitable linkage, including, for example, ether-containing or ester-containing linkages. Glycidyl ethers of polyhydric phenols and glycidyl esters of polyhydric phenols are preferred polyepoxides, with diglycidyl ethers being particularly preferred.

An exemplary polyepoxide compound for use in incorporating segments of Formula I into the stabilizer is depicted in the below Formula III:

Formula III

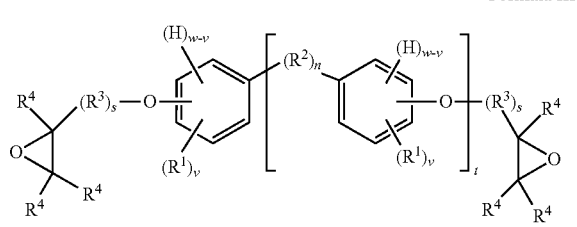

wherein:
$R^1$, $R^2$, n, t, v, and w are as described above for Formula I;
s is 0 to 1, more preferably 1;
$R^3$, if present, is a divalent group, more preferably a divalent organic group; and
preferably each $R^4$ is independently a hydrogen atom, a halogen atom, or a hydrocarbon group that may include one or more heteroatoms; more preferably each $R^4$ is a hydrogen atom.

When t is 1, the polyepoxide of Formula III is a segment of the below Formula IIIA:

Formula (IIIA)

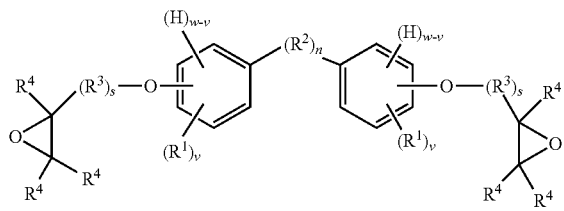

When t is 0, the polyepoxide of Formula III is a segment of the below Formula IIIB:

Formula IIIB

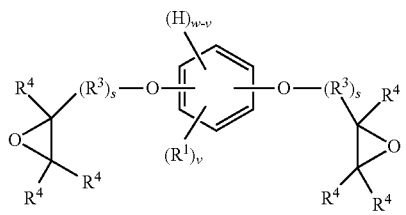

$R^3$ is typically a hydrocarbyl group, which may optionally include one or more heteroatoms. Preferred hydrocarbyl groups include groups having from one to four carbon atoms, with methylene groups being particularly preferred. In some embodiments, $R^3$ includes a carbonyl group. In one such embodiment, $R^3$ includes a carbonyl group that is attached to the oxygen atom depicted in Formula III (e.g., as in an ester linkage).

Preferred polyepoxide compounds of Formula III are non-mutagenic, more preferably non-genotoxic. A useful test for assessing both mutagenicity and genotoxicity is the mammalian in vivo assay known as the in vivo alkaline single cell gel electrophoresis assay (referred to as the "comet" assay). The method is described in: Tice, R. R. "The single cell gel/comet assay: a microgel electrophoretic technique for the detection of DNA damage and repair in individual cells." *Environmental Mutagenesis*. Eds. Phillips, D. H and Venitt, S. Bios Scientific, Oxford, UD, 1995, pp. 315-339. A negative test result in the comet assay indicates that a compound is non-genotoxic and, therefore, non-mutagenic, though a positive test does not definitively indicate the opposite and in such cases a more definitive test may be utilized (e.g., a two-year rat feeding study).

If t of Formula III is 0, v is preferably 1 or more, more preferably 2 or more. While not intending to be bound by theory, it is believed that the presence of one or more $R^1$ groups, and particularly one or more ortho R1 groups, can contribute to the diepoxide of Formula IIB being non-genotoxic.

The polyhydric phenol compounds of Formula II can also be converted to a diepoxide using epichlorohydrin. By way of example, below is a diepoxide formed via an epichlorohydrin epoxidation of 4,4'-methylenebis(2,6-di-t-butylphenol).

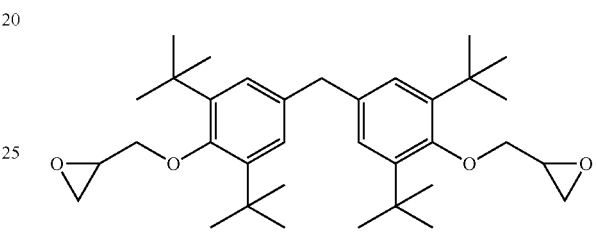

Somewhat surprisingly, the polyhydric phenol compounds such as 4,4'-methylenebis(2,6-di-t-butylphenol) can undergo a condensation reaction with epichlorohydrin to form a diepoxide that is reactive with conventional dihydric phenols that are not substituted at the ortho or meta positions.) While not wishing to be bound by theory, it is believed that the hydroxyl groups of such polyhydric phenol compounds are generally not sufficiently accessible to efficiently react with an oxirane group of a diepoxide monomer and form an ether linkage. Nonetheless, it is contemplated that a "hindered" polyhydric phenol compound of Formula II may be selected such that the hydroxyl groups are sufficiently sterically hindered so that the compound does not exhibit appreciable estrogenic activity, while the hydroxyl groups are still sufficiently accessible so that the compound can react with a diepoxide and build molecular weight under reasonable process times and conditions (e.g., less than 24 hours of reaction time at a reaction temperature of less than about 240° C.).

In certain preferred embodiments, the polyhydric phenol compound of Formula II is substituted at one or both ortho ring positions of each depicted phenylene group with an $R^1$ group that includes from 1 to 4 carbon atoms, more preferably from 1 to 3 carbon atoms, and even more preferably 1 to 2 carbon atoms. In some embodiments, methyl groups are preferred ortho $R^1$ groups, with the methyl moiety (e.g., —$CH_3$) being particularly preferred. While not intending to be bound by theory, it has been observed that the presence of large ortho substituent groups can sometimes affect the efficiency by which certain polyhydric phenol compounds of Formula II are converted into diepoxides using epichlorohydrin and, moreover, the efficiency by which the resulting diepoxide can be upgraded into a polyether polymer having segments of Formula I.

Any suitable upgrade polyhydric phenol may be used in forming the disclosed stabilizer. However, the use of bisphenol A is not preferred. Preferred upgrade dihydric phenols are free of bisphenol A and preferably do not exhibit appreciable estrogenic activity. In certain preferred embodiments, the polyepoxides of Formula IIIB are upgraded with polyhydric monophenols of Formula IIB.

Examples of suitable upgrade dihydric phenols for use in forming the stabilizer include any of the compounds of Formula II, with compounds of Formula III in which the hydroxyl group are unhindered by adjacent R groups being generally preferred for purposes of reaction efficiency. Some specific examples of suitable upgrade dihydric phenols include hydroquinone, catechol, p-tert-butyl catechol, resorcinol, or a mixture thereof. In some embodiments, hydroquinone is a preferred upgrade material.

In some embodiments, the upgrade dihydric phenol is a compound of Formula III and includes an $R^2$ group having one or more cyclic groups (e.g., alicyclic or aromatic groups), which may be monocyclic or polycyclic groups (e.g., a divalent: norbornane, norbornene, tricyclodecane, bicyclo[4.4.0]decane, or isosorbide group, or a combination thereof). In some embodiments, $R^2$ of the upgrade dihydric phenol includes one or more ester linkages. For example, in some embodiments, $R^2$ is a —$R^{6w}$—Z—R5-Z—$R^{6w}$— segment, where: $R^5$ is a divalent organic group; each $R^6$, if present, is independently a divalent organic group; each Z is independently an ester linkage that can be of either directionality (e.g., —C(O)—O— or —O—C(O)—); and each w is independently 0 or 1. In one such embodiment, $R^5$ includes at least one divalent cyclic group such as, for example, a divalent polycyclic group, a divalent aryl or heteroarylene group (e.g., a substituted or unsubstituted phenylene group) or a divalent alicyclic group (e.g., a substituted or unsubstituted cyclohexane or cyclohexene group). In one embodiment, $R^2$ is —$R^{6w}$—C(O)—O—R5-O—C(O)—$R^{6w}$—. For further discussion of suitable segments containing ester linkages and materials for incorporating such segments into the disclosed polymer, see U.S. Published Application No. 2007/0087146 by Evans et al. and Published International Application No. WO 2011/130671 by Niederst et al.

By way of example, an upgrade dihydric phenol having a cyclic-group-containing R2 may be formed by reacting (a) a suitable amount (e.g., about 2 moles) of a Compound A having a phenol hydroxyl group and a carboxylic acid or other active hydrogen group with (b) a suitable amount (e.g., about 1 mole) of a di-functional or higher Compound B having one or more cyclic groups (monocyclic or polycyclic) and two or more active hydrogen groups capable of reacting with the active hydrogen group of Compound A. Examples of preferred Compounds A include 4-hydroxy phenyl acetic acid, 3-hydroxybenzoic acid, 4-hydroxybenzoic acid, and derivatives or mixtures thereof. Examples of preferred Compounds B include cyclic-containing diols such as cyclohexane dimethanol (CHDM); tricyclodecane dimethanol (TCDM); 2,2,4,4-tetramethyl-1,3-cyclobutanediol, a polycyclic anyhydrosugar such as isosorbide, isomannide, or isoidide; and derivatives or mixtures thereof. In some embodiments, the cyclic group may be formed after reaction of Compounds A and B. For example, a Diels-Alder reaction (using, e.g., cyclopentadiene as a reactant) could be used to incorporate an unsaturated bicyclic group such as a norbornene group into Compound B, in which case Compound B in its unreacted form would need to include at least one non-aromatic carbon-carbon double bond in order to participate in the Diels-Alder reaction. For further discussion of suitable materials and techniques relating to such Diels-Alder reactions see, for example, Published International App. Nos. WO 2010/118356 by Skillman et al. and WO 2010/118349 by Hayes et al.

Some examples of cyclic-group-containing and ester-link-containing upgrade dihydric phenol compounds are provided below. These compounds are discussed in further detail in the previously referenced Published International Application No. WO 2011/130671 by Niederst et al.

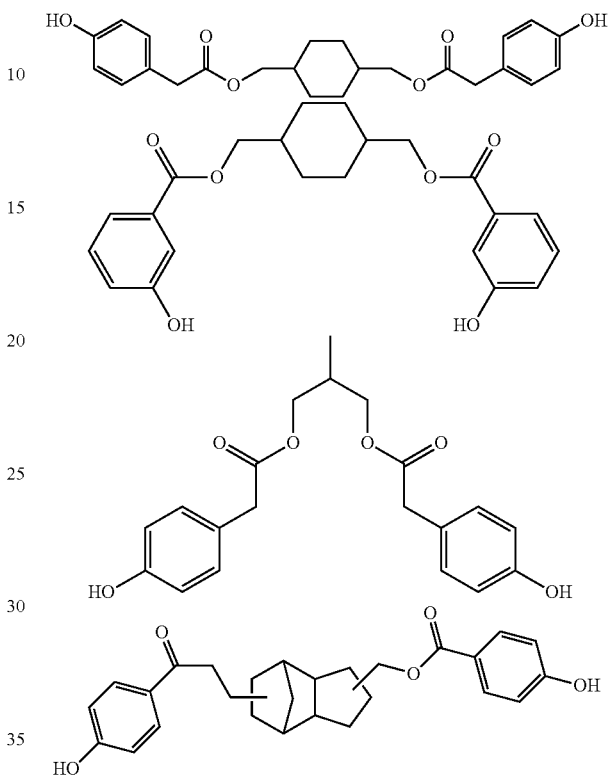

It is also contemplated that the disclosed stabilizer may be formed via reaction of ingredients including the dihydric phenol compound of Formula II and a diepoxide other than that of Formula III. Examples of such compounds include compounds such as 1,4-cyclohexanedimethanol digylcidyl ether (CHDMDGE), neopentyl glycol digylcidyl ether, 2-methy-1,3-propanediol diglycidyl ether, tricyclodecane dimethanol diglycidyl ether, and combinations thereof. While not intending to be bound by theory, some such aliphatic diepoxides (e.g., CHDMDGE and neopentyl glycol digylcidyl ether) that tend to yield polymers having lower Tg values may not be suitable for certain interior packaging coating applications in which a relatively high Tg polymer is desirable for purposes of corrosion resistance, although they may be suitable for exterior packaging coating applications or other end uses.

Other examples of suitable polyhydric phenols that may be used to form the disclosed stabilizer include polyhydric phenols disclosed in U.S. patent application Ser. No. 13/570,632 filed Aug. 9, 2012, entitled "Compositions for Containers and Other Articles and Methods of Using Same" and which is incorporated herein by reference in its entirety.

In preferred embodiments, the coating compositions are at least substantially free of mobile BPA or BADGE, and more preferably are completely free of BPA or BADGE. More preferably, the coating composition is at least substantially free, and more preferably completely free, of mobile or bound polyhydric phenols having estrogenic agonist activity greater than or equal to that of 4,4'-(propane-2,2-diyl)polyhydric phenol, more preferably that of BPS, even more preferably 2,2-bis-(4-hydroxyphenyl)-1-propanol.

The disclosed coating composition may include any suitable amount of stabilizer to produce the desired result. The coating compositions may include, for example, at least about 2.5, more preferably at least about 10, and even more preferably at least about 25 wt. % of stabilizer, based on the total novolatile weight of the coating composition. Preferably, the disclosed coating composition include less than about 65, more preferably less than about 60, and even more preferably less than about 55 wt. % of stabilizer, based on the total nonvolatile weight of the coating compositions.

The disclosed stabilizer may be made in a variety of molecular weights. Preferred stabilizer preferably have a molecular weight number average molecular weight (Mn) and for polymeric stabilizers (i) suitable for efficient application of the coating system to a substrate (e.g., to avoid, for example, unsuitable misting or sticking) or (ii) suitable to achieve good compatibility with other materials (especially thermoplastic materials such as PVC) present in the coating system. Preferred stabilizers have a $M_n$ molecular weight of at least 200, more preferably at least 300, and even more preferably at least 400. The molecular weight of the stabilizer may be as high as is needed for the desired application. Typically, however, the molecular weight of the stabilizer is less than about 8,500 evaluated as number average molecular weight $M_n$).

The epoxy value of the disclosed stabilizers can vary depending upon the desired end use. The disclosed stabilizer, for example, may have an epoxy value (EV) in the range of 0.005 to 0.8 equivalents per 100 gms resin. The potentiometric determination of the epoxide content of epoxy resins is typically determined using perchloric acid in acetic acid. The 1,2 epoxy group reacts stoichiometrically with hydrogen bromide generated by the reaction of perchloric acid with tetrabutylammonium bromide. This method is a modification of ASTM D1652.

In some embodiments, the disclosed coating composition may be formulated using one or more curing agents, including, for example, one or more crosslinkers. The choice of a particular crosslinker typically depends on the particular product being formulated. For example, some coating compositions are highly colored (e.g., gold-colored coatings). These coatings may typically be formulated using crosslinkers that tend to have a yellowish color. In contrast, white coatings are generally formulated using non-yellowing crosslinkers, or only a small amount of a yellowing crosslinker.

The concentration of crosslinker included in the disclosed coating composition may vary depending upon the desired result. Preferred coating compositions contain at least about 0.01, more preferably at least about 0.5, and more preferably at least about 3 wt. % of crosslinker, by weight of nonvolatile material in the coating composition. Preferred coating compositions contain less than about 30, more preferably less than about 25, and even more preferably less than about 20 wt. % of crosslinker, by weight of nonvolatile material in the coating composition.

Any suitable crosslinker can be used. For example, phenolic crosslinkers (e.g., phenoplasts), amino crosslinkers (e.g., aminoplasts), and combinations thereof, may be used.

Examples of suitable phenolic crosslinkers (e.g., phenoplasts) include the reaction products of aldehydes with phenols. Formaldehyde and acetaldehyde are preferred aldehydes.

Examples of suitable phenols that can be employed include phenol, cresol, p-phenylphenol, p-tert-butylphenol, p-tert-amylphenol, cyclopentylphenol, cresylic acid, BPA (not presently preferred), and combinations thereof. Examples of suitable commercially available phenolic compounds include the BAKELITE 6535LB, 6581 LB, and 6812LB (each available from Hexion Specialty Chemicals GmbH), DUREZ 33162 (Durez Corporation, Addison, Tex.), PHENODUR PR 285 55/IB/B and PR 897 (each available from CYTEC Surface Specialties, Smyrna, Ga.), and SANTOLINK EP 560 products.

Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, urea-formaldehyde-based resins, and mixtures thereof.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, CYMEL 301, CYMEL 303, CYMEL 370, CYMEL 373, CYMEL 1131, CYMEL 1125, and CYMEL 5010 (all available from Cytec Industries Inc., West Patterson, N.J.); the Maprenal MF 980 product (Cytec Industries Inc.); and Uramex BF 892 (available from DSM, Netherlands).

Examples of suitable isocyanate crosslinking agents include blocked or non-blocked aliphatic, cycloaliphatic or aromatic di-, tri-, or poly-valent isocyanates, such as hexamethylene diisocyanate, cyclohexyl-1,4-diisocyanate, mixtures thereof, and the like.

The coating composition may also include a catalyst to increase the rate of cure. If used, a catalyst is preferably present in an amount of from about 0.05 wt. % to about 1 wt. %, and more preferably from about 0.1 wt. % to about 0.5 wt. % of nonvolatile material. Examples of catalysts suitable for use in curing the one or more optional crosslinkers may include acid catalysts such as phosphoric acid, citric acid, dinonylnaphthalene disulfonic acid (DNNSA), dodecylbenzene disulfonic acid (DDBSA), p-toluene sulfonic acid (p-TSA), dinonylnaphthalene disulfonic acid (DNNDSA), phenyl acid phosphate (PAP), alkyl acid phosphate (AAP) and the like, and mixtures thereof. Examples of catalysts suitable for use in curing self-crosslinker able compositions include tertiary amines, certain metallic compounds (e.g., tin, bismuth, etc.), or mixtures thereof.

The coating compositions may optionally include additives that do not adversely affect the coating composition or a cured coating composition resulting therefrom. The optional additives are preferably at least substantially free of mobile BPA, BPF, BPS and aromatic glycidyl ether compounds (e.g., BADGE, BFDGE). Suitable additives include, for example, those that improve the processability or manufacturability of the composition, enhance composition aesthetics, or improve a particular functional property or characteristic of the coating composition or the cured composition resulting therefrom, such as adhesion to a substrate. Additives may include carriers, catalysts, emulsifiers, pigments, metal powders or paste, fillers, anti-migration aids, anti-microbials, extenders, curing agents, lubricants, coalescents, wetting agents, biocides, antifoaming agents, colorants, waxes, anti-oxidants, anticorrosion agents, flow control agents, thixotropic agents, dispersants, adhesion promoters, UV stabilizers, scavenger agents, or combinations thereof. Each optional ingredient can be included in a sufficient amount to serve its intended purpose, but preferably not in such an amount to adversely affect a coating composition or a cured coating composition resulting therefrom. In addition, the coating composition may also include one or more secondary film forming compounds Thermoplastic dispersions can be prepared using any suitable method to preferably provide sufficient suspension and dispersion of the particles included therein. Examples of suitable methods include solution blending, high-speed dispersion, high-speed milling, and the like. A substantially homogeneous dispersion of the particles throughout the liquid carrier typically indicates an adequate mixture or blend. The thermoplastic particles preferably remain substantially undissolved in the liquid carrier.

To prepare the disclosed coating composition, a thermoplastic dispersion is generally made in a first step (a dispersion phase) where the composition is thickened and has somewhat higher solids than the subsequent phase, often referred to as the "let down," where the components (e.g., addition of the stabilizer) are stirred at a slower rate. Examples of suitable process methods to make the disclosed coating composition include admixture, blending, paddle stirring, and the like.

The cured coatings preferably adhere well to metal (e.g., steel, tin-free steel (TFS), tin plate, electrolytic tin plate (ETP) aluminum, and the like) and provide high levels of resistance to corrosion or degradation that may be caused by prolonged exposure to, for example, food or beverage products. The coatings may be applied to any suitable surface, including inside surfaces of containers, outside surfaces of containers, container ends, and combinations thereof.

The disclosed cured coatings are particularly well suited as adherent coatings for metal cans or containers, although many other types of articles can be coated. Examples of such articles include closures (including, e.g., internal surfaces of twist off caps for food and beverage containers); internal crowns; two and three-piece cans (including, e.g., food and beverage containers); shallow drawn cans; deep drawn cans (including, e.g., multi-stage draw and redraw food cans); can ends (including, easy open ends); monobloc aerosol containers; and general industrial containers, cans, and can ends.

The disclosed coating compositions are particularly suited for use on food-contact surfaces of food or beverage containers. Preferably, the cured coatings are retortable when employed in food and beverage container applications. Preferred cured coatings of the present invention can withstand elevated temperature conditions frequently associated with retort processes or other food or beverage preservation or sterilization processes. Particularly preferred cured coatings exhibit enhanced resistance to such conditions while in contact with food or beverage products that exhibit one or more aggressive (or corrosive) chemical properties under such conditions. Examples of such aggressive food or beverage products may include meat-based products, milk-based products, fruit-based products, energy drinks, and acidic or acidified products.

The disclosed coating composition can be applied in a single layer (e.g., monocoat) system or can constitute one or more layers (e.g., a base layer, an intermediate layer, or a topcoat layer or both) of a multi-coat system. The coating compositions are typically applied either (a) directly to a surface of a substrate or (b) to one or more intermediate coats (e.g., size coats) applied to the substrate. Examples of suitable size coats include polyester-based size coats (e.g. polyester size coats described in U.S. Pat. No. 8,142,858 or epoxy-based size coats disclosed in U.S. Application No. 61/681,590 filed Aug. 9, 2012, and combinations thereof. A specific example of a suitable polyester-phenolic size coat is a composition that includes about 60 to 80% by weight of nonvolatiles of one or more polyesters and about 20 to 40% by weight of nonvolatiles of one or more phenolic resins. The polyester size coat can optionally include crosslinkers such as, for example, aminoplast resins or blocked isocyanates.

In some embodiments, the disclosed coating composition is applied as a top coat over one or more size coats applied to, for example, an interior surface of a twist-off closure lid or easy open end for use with food or beverage containers. In other embodiments, the disclosed coating composition is applied as a monocoat directly to, for example, an interior surface of a three-piece or shallow drawn food can, a bottle crown, or a monobloc aerosol container.

The coating composition can be applied to a substrate using any suitable procedure such as, for example, spray coating, roll coating, coil coating, curtain coating, immersion coating, meniscus coating, kiss coating, blade coating, knife coating, dip coating, slot coating, slide coating, and the like, as well as other types of premetered coatings. In one embodiment where the coating is used to coat metal sheets or coils, the coating can be applied by roll coating.

The coating composition can be applied to a substrate prior to, or after, forming the substrate into an article. In a preferred embodiment, at least a portion of the substrate is coated with a layer of the coating composition of the present invention, which is then cured before the substrate is formed into an article.

After applying the coating composition onto a substrate, the composition can be cured using a variety of processes, including, for example, oven baking by either conventional or convectional methods, or any other method that provides an elevated temperature that preferably allows the thermoplastic material particles to fuse together. The curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating composition can be dried and heated in one step.

The curing process may be performed at temperatures in the range of about 177° C. to about 260° C., taking into account, however that the upper end of the temperature range can change depending on the decomposition temperature of the thermoplastic material. PVC, for example, typically begins to degrade at about 188° C., while other materials may degrade at higher or lower temperatures. In situations where PVC is used and the substrate coated is in metal sheet form, curing can be performed, e.g., at about 177° C. to about 260° C. for a suitable oven residence time (e.g. at about 5 to about 15 minutes). Where the coating compositions are applied on metal coils, curing is typically conducted at temperatures of about 210° C. to about 232° C. and suitable oven residence times (e.g. about 15-30 seconds).

The disclosed coatings preferably exhibit excellent coating properties. When suitably cured and tested pursuant to the methods of the Test Methods section shown below, the disclosed coatings exhibit one or more (and in some embodiments all or substantially all) of the below described coating properties.

The disclosed coating preferably exhibits an adhesion rating of at least 8.

The disclosed coating preferably exhibits a blush rating of at least 7.

The disclosed coating preferably exhibits a stain resistance rating of at least 6.

The disclosed coating preferably exhibits a porosity rating of less than about 10 milliamps (mA).

The disclosed coatings after retort pursuant to the Retort Method preferably exhibit an adhesion rating of preferably at least 8, more preferably at least 9, and most preferably 10.

The disclosed coatings after retort pursuant to the Retort Method preferably exhibit a blush rating of preferably at least 7, more preferably at least 8, even more preferably at least 9, and most preferably 10.

The disclosed coatings after retort pursuant to the Retort Method preferably exhibit a stain resistance rating of preferably at least 6, more preferably at least 8, even more preferably at least 9, and most preferably 10.

The disclosed coatings before retort or pasteurization pass preferably less than about 10 mA when tested pursuant to the Porosity Test, more preferably less than about 5, even more preferably less than about 2, and optimally less than about 1 mA. After pasteurization or retort, preferred coatings exhibit continuities of less than about 20, more preferably less than about 10, even more preferably less than about 5, and even more preferably less than about 2 mA.

The disclosed coatings exhibit a wedge bend percentage of greater than about 70, more preferably greater than about 80, even more preferably greater than about 85, and optimally greater than about 90%.

Test Methods

Unless indicated otherwise, the following test methods may be utilized in the Examples that follow.

A. Adhesion Test

Adhesion testing was performed to assess whether the coating compositions adhere to the coated substrate. The Adhesion Test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on.

B. Blush Resistance Test

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Samples of coated substrate were rated for blush as follows:

10: no observed blushing to the coating
8-9: a very slight haze observed on the surface of the coating
7: a slightly cloudy appearance to the coating observed
5-6: a moderate cloudy appearance to the coating observed
3-4: a cloudy appearance to the coating observed
1-2: near-complete whitening of the coating observed
0: complete whitening of the coating observed C. Stain Resistance Test Stain resistance is generally measured visually using a scale of 0-10, where a rating of "10" indicates no staining and a rating of "0" indicates a complete change of the color of the film. Samples of coated substrate were rated for stain resistance as follows:

10: no discoloration of the coating observed
8-9: very slight discoloration of the coating observed
7: some discoloration of the coating observed
6: appreciable discoloration of the coating observed
2-5: strong discoloration of the coating observed
0-1: very strong discoloration of the coating observed D. Porosity Test This test provides an indication of the level of flexibility of a coating. Moreover, this test measures the ability of a coating to retain its integrity as it undergoes the formation process necessary to produce a food or beverage can end or drawn can. In particular, it is a measure of the presence or absence of cracks or fractures in the formed end or can. To be suitable for food or beverage can end and drawn can applications, a coating composition should preferably exhibit sufficient flexibility to accommodate the extreme contour of the rivet portion of the easy open food or beverage can end and the draw of the can.

The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end. With a drawn can the electrolyte solution is place in the can above and below any bead and the amount of electrical current that passes through the end is then measured. If the coating remains intact, minimal current will pass through the can.

Fully converted 206 standard opening can ends or drawn cans were exposed for a period of 4 seconds to an electrolyte solution comprised of 1% NaCl by weight in deionized water. Metal exposures were measured using a WACO Enamel Rater II, available from the Wilkens-Anderson Company, Chicago, Ill., with an output voltage of 6.3 volts. The measured electrical current, in milliamps, is reported. End or drawn can continuities are typically tested initially and then after the ends are subjected to pasteurization or retort.

E. Retort Method

This test provides an indication of an ability of a coating to withstand conditions frequently associated with food or beverage preservation or sterilization. For the present evaluation, coated substrate samples (in the form easy open ends or drawn cans or flat panels) (were placed in a vessel and partially immersed in a test substance. While partially immersed in the test substance, the coated substrate samples were placed in an autoclave and subjected to heat of 121° C. and atmospheric suitable pressure for a time period of 90 minutes. After retort, the coated substrate samples were allowed to sit for at least 2 hours before being tested for adhesion, blush resistance, or stain resistance.

F. Wedge Bend Method

This test provides an indication of a level of flexibility of a coating and an extent of cure. For the present evaluation, test wedges were formed from coated rectangular metal test sheets (which measured 12 cm long by 10 cm wide). Test wedges were formed from the coated sheets by folding (e.g., bending) the sheets around a mandrel. To accomplish this, the mandrel was positioned on the coated sheets so that it was oriented parallel to, and equidistant from, the 12 cm edges of the sheets. The resulting test wedges had a 6 mm wedge diameter and a length of 12 cm. To assess the wedge bend properties of the coatings, the test wedges were positioned lengthwise in a metal block of a wedge bend tester and a 2.4 kg weight was dropped onto the test wedges from a height of 60 cm.

The deformed test wedges were then immersed in a copper sulphate test solution (prepared by combining 20 parts of $CuSO_4.5H_2O$, 70 parts of deionized water, and 10 parts of hydrochloric acid (36%)) for about 2 minutes. The exposed metal was examined under a microscope and the millimeters of coating failure along the deformation axis of the test wedges was measured.

The data is expressed as a wedge bend percentage using the following calculation:

100%×[(120 mm)−(mm of failure)]/(120 mm).

A coating is considered herein to satisfy the Wedge Bend Test if it exhibits a wedge bend percentage of 70% or more.

EXAMPLES

The present invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight.

Example 1

Synthesis of the diglycidyl ether of 4,4'Methylenebis(2,6-dimethylphenol)

4,4'-Methylenebis(2,6-dimethylphenol) (32 grams, 0.125 moles), epichlorohydrin (140 milliliters, 1.79 moles), and 2-propanol (150 milliliters) were heated to 80° C. in an oil bath. Sodium hydroxide (12.5 grams, 0.313 moles) in water (20 milliliters) was added in portions over 5 minutes. The purple solution was heated for 2 hours at 80° C. The mixture was cooled to room temperature, filtered, and concentrated on a rotary evaporator at a temperature of about 30-40° C. The remaining oil was mixed with dichloromethane (50 milliliters) and heptane (100 milliliters) and allowed to stir for 30 minutes at ambient temperature. The salts were removed by filtration and the filtrate was concentrated on a rotary evaporator at 30-40° C. The remaining oil was dried under high vacuum at ambient temperature until a constant weight was obtained. The crude product was crystallized twice from methanol (250 milliliters) and dried under high vacuum at ambient temperature until a constant weight was obtained. The experiment generated diglycidyl ether of 4,4'-methylenebis(2,6-dimethylphenol) (28 grams, 60% yield) as a white solid. The epoxy value was 0.543 equivalents per 100 grams.

Example 2

Reaction Between 2 Moles of 3-Hydroxybenzoic Acid with 1 Mole 1,4-Cyclohexane Dimethanol To a 4-neck round-bottom flask equipped with a mechanical stirrer, a watercooled condenser on top of a Dean-Stark Trap filled with xylene, and a thermocouple connected to a heating control device and a heating mantle was added 480.7 parts of the CHDM-90 product (90% cyclohexane dimethanol in water from Eastman), 828.7 parts of 3-hydroxybenzoic acid (from Aceto), 360 parts xylene and 5.71 parts p-toluenesulfonic acid. Stirring and heating was carried for 2 hours until the batch reached 145° C. and the xylene was refluxing. The batch was heated at 145° C. for 10 more hours, at which time 162 parts of water were collected. At that time, heating was increased until the batch reached 168° C., at which time 220 ml of xylene was collected, and the batch was discharged. The material was a solid at room temperature that could be broken up and dried to >99% solids overnight in a vacuum oven at 115° C.

Example 3

Synthesis of Tetramethylbisphenol F Diglycidyl Ether (TMBPF DGE)/Hydroquinone (HQ) Polymer To a 4-neck round-bottom flask equipped with a mechanical stirrer, a nitrogen inlet to maintain a nitrogen blanket, a water-cooled condenser, and a thermocouple connected to heating control device and a heating mantle was added 833.3 parts of TMBPF DGE (at 94.8% solids in xylene-790 parts neat. Epoxy value=0.527 eq/100 grams), 210 parts of hydroquinone, 1 part catalyst 1201, and 20.4 parts ethyl carbitol. This mixture was heated with stirring to 125° C., allowed to exotherm to 172° C., then heated at 160° C. for 3 hours until the epoxy value was 0.038 eq/100 g. At this point to the mixture was added 936.3 parts cyclohexanone, while the mixture was cooled to 70° C. The batch was discharged affording a solvent-based polymer with a nonvolatile content=50.6%, epoxy value=0.034 eq/100 grams, and viscosity=16,300 centipoise.

Example 4

Synthesis of Tetramethylbisphenol F Diglycidyl Ether (TMBPF DGE)/Cyclohexane dimethanol-3-hydroxybenzoic acid (CHDM-3-HBA) Polymer To a 4-neck round-bottom flask equipped with a mechanical stirrer, a nitrogen inlet to maintain a nitrogen blanket, a water-cooled condenser, and a thermocouple connected to heating control device and a heating mantle was added 460.8 parts of TMBPF DGE (at 94.8% solids in xylene-790 parts neat), 387.1 parts of the CHDM/3-HBA synthesized above in Example 2, 2.47 parts catalyst 1201, and 19.4 parts methisobutyl ketone. This mixture was heated with stirring to 125° C., allowed to exotherm to 143° C., then heated at 160° C. for 2 hours until the epoxy value was 0.038 eq/100 g. At this point to the mixture was added 780.6 parts cyclohexanone while the mixture was cooled to 70° C. The batch was discharged affording a solvent based polymer with a nonvolatile content=50.8%, epoxy value=0.034 eq/100 grams, and viscosity=8000 centipoise.

Examples 5-6

Preparation of Organosol Stabilizer Coating Composition

The organosol compositions are provided in Table 3. To prepare the coating composition with the stabilizer, the polymers of Examples 3 and 4 were charged to a vessel with ingredient 1 and stirred until blended. Item 3 was then added and dispersed to obtain a fineness of 7 on the Hegman scale. In a separate container, items 4-8 were blended and mixed until item 8 was fully dissolved. Once fully dissolved, the blend was added into dispersion mix. Item 9 was then added and stirred until blended. In a separate container, items 10-12 were blended and dispersed to obtain a fineness of 6 on the Hegman scale. Once dispersed, the blend was added to items 1-9, followed by item 13, which was stirred until blended. Items 14 and 15 were pre-mixed and then added to the batch to produce the organosol coating composition.

TABLE 3

| Item | Raw Material | Ex. 5 | Ex. 6 |
|---|---|---|---|
| 1 | Solvesso 100 | 2.33 | 2.33 |
| 2a | Polyether A (from Ex. 3) | 26.03 | — |
| 2b | Polyether B (from Ex. 4) | — | 26.03 |
| 3 | $TiO_2$ | 12.31 | 12.31 |
| 4 | Solvesso 100 | 11.69 | 11.69 |
| 5 | Cyclohexanone | 2.59 | 2.59 |
| 6 | Diacetone Alcohol | 6.99 | 6.99 |
| 7 | Dibasic Ester | 4.63 | 4.63 |
| 8 | Solution Vinyl Resin | 5.52 | 5.52 |
| 9 | Amino Resin | 4.93 | 4.93 |
| 10 | Plasticizer | 3.80 | 3.80 |
| 11 | Solvesso 100 | 8.71 | 8.71 |
| 12 | Dispersion-grade thermoplastic | 8.26 | 8.26 |
| 13 | Lubricant | 0.47 | 0.47 |
| 14 | Isopropanol | 1.53 | 1.53 |
| 15 | Catalyst | 0.21 | 0.21 |
|   |   | 100.00 | 100.00 |

Examples 7-8

Mono-Coat Substrate Coating

The organosol stabilizer coating compositions of Examples 5-6 were evaluated by applying the composition to chrome-treated aluminum sheets using a bar coater. In Example 7, the Example 5 coating composition was used and in Example 8, the Example 6 coating composition was used. The coated substrate samples were then cured in a gas-fired oven for 11 minutes at 224° C. (435° F.) peak metal temperatures (PMT). The targeted dry film weight of the cured organosol coating was about 8.2 g/m².

The cured coated sheets for Example 7 and Example 8 were then fabricated into easy-open food can ends and by drawing 202×200 food cans. The 202×200 food cans were further beaded. The coated samples were subjected to various tests such as dry adhesion, water retort adhesion and water retort blush on the upper sidewall (USW) and lower side wall (LSW). The coated samples were also subjected to porosity testing. The performance of Examples 7-8 were compared to a top-coat lacquer containing a combination of a PVC organosol and a BPA containing epoxy resin stabilizer. The results are shown in Table 4.

TABLE 4

| Coating Composition | Comparative Example | Example 7 | Example 8 |
|---|---|---|---|
| Coated Sheets |  |  |  |
| Adhesion | 10/10 | 10/10 | 10/10 |
| Blush | 10/10 | 10/10 | 10/10 |

TABLE 4-continued

| Coating Composition | Comparative Example | Example 7 | Example 8 |
|---|---|---|---|
| 202 × 200 Beaded Can |  |  |  |
| Dry Adhesion (USW/LSW) | 10/10 | 9/10 | 9/10 |
| Blush | 10/10 | 10/9 | 10/10 |
| Adhesion (USW/LSW) | 10/10 | 10/10 | 10/10 |
| Porosity Test Below Bead (mA) (Before/After) process 206 End Porosity Test | 8.8/22 | 2/2.4 | 5.8/11.7 |
| Before/After Process (mA) | 1.7/3 | 3.9/9.5 | 3.9/6.9 |

The results show that the organosol stabilizer of Examples 7 and 8 exhibits generally similar coating characteristics (e.g. flexibility, adhesion) compared to a known BPA-containing stabilizer. In addition, the coating compositions resulted in little or no discoloration over time suggesting the hydrochloric acid is being scavenged.

The coated substrate samples of Examples 7 and 8 were also retorted according to the Retort Method described above in two test substances, namely cat food and dog food. After retort in one of the above test substances, the coated substrate samples of Examples 7 and 8 were subjected to the Adhesion Test. The results are shown in Table 5.

TABLE 5

| Coating Composition | Example 7 | Example 8 |
|---|---|---|
| Adhesion after exposure to cat food | 10 | 10 |
| Adhesion after exposure to dog food | 9 | 9 |

The above results showed that the cured coating composition of Examples 7 and 8 exhibited good adhesion when retorted in food samples containing fat and protein.

Example 9

Synthesis of the diglycidyl ether of 2,5-di-t-butyl hydroquinone and a Polyether Polymer Therefrom 2,5-di-tert-butylhydroquinone (30 g, 0.135 mol) was dissolved in 2-propanol (500 mL) and epichlorohydrin (100 g, 1.08 mol) at room temperature. Sodium hydroxide (16.2 g, 0.405 mol) in water (63 mL) was added in portions over 5-10 minutes. After stirring for 30 minutes the purple solution was heated to 70° C. The mixture stirred overnight at 70° C. After 20 hours, the solution was cooled to room temperature and filtered. The 2-propanol was removed on a rotary evaporator at 30° C. The remaining mixture was diluted with water (400 mL) and extracted with ethyl acetate (1 L). The organic extract was dried over sodium sulfate. After filtration and concentration under reduced pressure, the remaining oil was dried under high vacuum at ambient temperature until a constant weight was obtained. The crude product (48.4 g, orange solid) was stirred with hot methanol (200 mL) for 30 minutes. The methanol was allowed to cool to room temperature, while stirring. The solid product was filtered and suspended again in hot methanol (150 mL). After cooling and filtering, the semi-purified product (30.1 g, 90-95% purity by NMR) was crystallized from hot ethyl acetate (50 mL). The ethyl acetate was cooled to room temperature and then refrigerated for 4 hours at −10° C. The crystallized product was filtered and dried under high vacuum at ambient temperature until a constant weight was obtained. The experiment generated the diglycidyl ether of 2,5-di-tert-butylhydroquinone (19.4 g, 43% yield) as a white solid. The epoxy value was 0.577 equivalents per 100 grams of material.

To a 4-neck round-bottom flask equipped with a mechanical stirrer, a nitrogen inlet to maintain a nitrogen blanket, a water-cooled condenser, and a thermocouple connected to heating control device and a heating mantle was added 15.34 parts of the diglycidyl ether of 2,5-di-tert-butyl hydroquinone, 4.54 parts of hydroquinone, 0.018 part CATALYST 1201, and 1.05 parts ethyl carbitol. This mixture was heated with stirring to 125° C., allowed to exotherm to 169° C., then heated at 160° C. for 3 hours until the epoxy value was 0.034 equivalents per 100 grams. At this point to the mixture was added 18.8 parts cyclohexanone, while the mixture was cooled to 70° C. The batch was discharged affording a solvent-based polymer with a nonvolatile content ("NVC") of 50% and an epoxy value of 0.034 equivalents per 100 grams of polymer. The polymer had an Mn of 6,520, a PDI of 2.47, and exhibited a Tg of 74° C.

Example 10

The bisphenol free epoxy resin of Example 9 may be used to make a coating composition, for example by substituting the resin for the polyether in Examples 5 or 6.

All patents, patent applications and literature cited in the specification are hereby incorporated by reference in their entirety. In the case of any inconsistencies, the present disclosure, including any definitions therein will prevail.

What is claimed is:

1. A coating composition comprising:
   a thermoplastic dispersion; and
   an epoxy-functional stabilizer derived from:
   (i) a polyhydric phenol having one or more aryl or heteroaryl groups in which each aryl or heteroaryl group includes a hydroxyl group attached to the ring and a substituent group attached to the ring at an ortho or meta position relative to the hydroxyl group; or
   (ii) a polyhydric phenol having two or more aryl or heteroaryl groups joined by a polar linking group or by a linking group having a molecular weight of at least 125 Daltons; or
   (iii) a polyhydric phenol having the features of both (i) and (ii); and
   wherein the coating composition is substantially free of diphenols having estrogenic activity greater than or equal to that of bisphenol S.

2. The coating composition of claim 1, wherein the stabilizer is derived from a polyhydric phenol having one or more aryl or heteroaryl groups in which each aryl or heteroaryl group includes a hydroxyl group attached to the ring and a substituent group attached to the ring at an ortho or meta position relative to the hydroxyl group.

3. The coating composition of claim 1, wherein the stabilizer is derived from a polyhydric phenol having two or more aryl or heteroaryl groups joined by a polar linking group or by a linking group having a molecular weight of at least 125 Daltons.

4. The coating composition of claim 1 wherein the stabilizer includes one or more segments of Formula I:

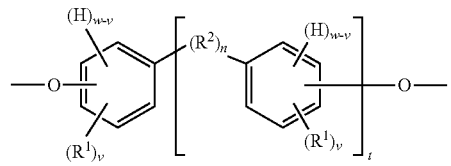

Formula I wherein:
H denotes a hydrogen atom if present;
each $R^1$ is independently an atom or group having an atomic weight of at least 15 Daltons;
v is independently 0 to 4; with the proviso that if v is 0, then n is 1 or the phenylene groups depicted in Formula I join to form a fused ring system;
w is 4;
$R^2$, if present, is a divalent group;
n is 0 or 1; with the proviso that if n is 0, the phenylene groups depicted in Formula I can optionally join to form a fused ring system in which case w is 3 and v is 0 to 3;
t is 0 or 1;
if v is 0 and t is 1, $R^2$ is polar linking group or a linking group having a molecular weight of at least 125 Daltons;
two or more $R^1$ or $R^2$ groups can join to form one or more cyclic groups;
and wherein the coating composition is substantially free of polyhydric phenols having estrogenic activity greater than or equal to that of bisphenol S.

5. The coating composition of claim 4, wherein t is 0.

6. The coating composition of claim 4, wherein each v independently 1 to 4 and the phenylene groups depicted in Formula 1 include at least one $R^1$ group attached to the phenylene ring at an ortho position relative to the oxygen atom.

7. The coating composition of claim 4, wherein each v is independently 2 to 4 and an $R^1$ group is attached to the phenylene ring at both ortho positions relative to the oxygen atom.

8. The coating composition of claim 4, wherein the $R^1$ groups independently comprise methyl or ethyl groups attached to the phenylene ring at an ortho position relative to the oxygen atom.

9. The coating composition of claim 4, wherein an $R^1$ group is attached to the phenylene ring at an ortho position relative to the oxygen atom, and a width measured perpendicular from a center-line of the phenylene ring to the maximal outside extent of the van der Waals volume of $R^1$ is greater than about 4.5 Angstroms.

10. The coating composition of claim 4, wherein:
n is 1;
$R^2$ is an organic group having from 1 to 10 carbon atoms; and
the oxygen atom of each phenylene group depicted in Formula I is located at a para position relative to $R^2$.

11. The coating composition of claim 4, wherein:
n is 1;
$R^2$ is a divalent group.

12. The coating composition of claim 4, wherein:
n is 1;
$R^2$ is —$CH_2$—.

13. The coating composition of claim 4 wherein:
v is 0;
n is 1; and
R² is a polar linking group or a linking group having a molecular weight of at least 125 Daltons.

14. The coating composition of claim 4, wherein the segments of Formula I are derived from one or more of the diglycidyl ether of 4,4'-methylenebis(2,6-di-t-butylphenol), the diglycidyl ether of 2,2'-methylenebis(4-methyl-6-t-butylphenol), the diglycidyl ether of 44'-methylenebis(2,6-dimethylphenol), the diglycidyl ether of 4,4'-butylidenebis(2-t-butyl-5-methylphenol), the diglycidyl ether of bis-(3,5-dimethyl-4-hydroxyphenyl)methane, the diglycidyl ether of 2,5-di-t-butylhydroquinone, or a derivative or combination thereof.

15. The coating composition of claim 1, wherein the thermoplastic dispersion comprises thermoplastic halogenated polyolefin particles dispersed in a liquid carrier.

16. The coating composition of claim 1, wherein the thermoplastic dispersion comprises a vinyl organosol.

17. The coating composition of claim 1, wherein the stabilizer includes at least two epoxy end groups.

18. The coating composition of claim 1, wherein the stabilizer is derived from a polyhydric phenol or derivative thereof that exhibits a log Relative Proliferative Effect value in an MCF-7 cell proliferation assay less than that of bisphenol S.

19. A packaging article with the composition of claim 1 adhered to at least a portion of a surface thereof.

20. A packaging article according to claim 19, wherein the packaging article comprises a food or beverage container or a portion thereof having a cured coating composition of claim 1 adhered to at least a portion of an interior surface.

21. A method comprising:
applying the coating composition of claim 1 to a substrate or portion thereof; and
curing the coating composition to form a cured coating on the substrate or portion thereof.

22. A method comprising:
applying a coating composition to at least a portion of a metal substrate prior to or after forming the metal substrate into a container or portion thereof, the coating composition comprising a thermoplastic dispersion and an epoxy-functional stabilizer derived from a polyhydric phenol that includes one or more segments of Formula I:

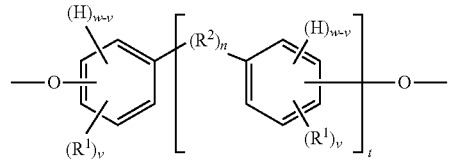

Formula I

Formula I
wherein:
H denotes a hydrogen atom, if present;
each R¹ is independently an atom or group having an atomic weight of at least 15 Daltons;
v is independently 0 to 4; with the proviso that if v is 0, then n is 1 or the phenylene groups depicted in Formula I join to form a fused ring system;
w is 4;
R², if present, is a divalent group; a polar linking group or a linking group having a molecular weight of at least 125 Daltons;
n is 0 or 1; with the proviso that if n is 0, the phenylene groups depicted in Formula I can optionally join to form a fused ring system in which case w is 3 and v is 0 to 3;
t is 0 or 1;
if v is 0 and t is 1, R² is a polar linking group or a linking group having a molecular weight of at least 125 Daltons; and
two or more R¹ or R² groups can join to form one or more cyclic groups; and
drying and at least partially curing the composition to produce a cured coating system adhered to the metal substrate and wherein the coating composition is substantially free of polyhydric phenols having estrogenic activity greater than or equal to that of bisphenol S.

* * * * *